United States Patent
Grassadonia et al.

(10) Patent No.: US 11,783,314 B2
(45) Date of Patent: *Oct. 10, 2023

(54) CONTACTS FOR MISDIRECTED PAYMENTS AND USER AUTHENTICATION

(71) Applicant: Block, Inc., Oakland, CA (US)

(72) Inventors: Brian Grassadonia, San Francisco, CA (US); Ayokunle Omojola, San Francisco, CA (US); Michael Moring, San Francisco, CA (US); Robert Andersen, Brooklyn, NY (US); Daniele Perito, San Francisco, CA (US); Kristopher Stipech, New York, NY (US)

(73) Assignee: Block, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/066,062

(22) Filed: Oct. 8, 2020

(65) Prior Publication Data

US 2021/0027270 A1 Jan. 28, 2021

Related U.S. Application Data

(63) Continuation of application No. 15/419,940, filed on Jan. 30, 2017, now Pat. No. 10,810,569.

(51) Int. Cl.
*G06Q 20/32* (2012.01)
*G06Q 20/40* (2012.01)
*G06Q 20/10* (2012.01)

(52) U.S. Cl.
CPC .......... *G06Q 20/322* (2013.01); *G06Q 20/10* (2013.01); *G06Q 20/325* (2013.01); *G06Q 20/40* (2013.01)

(58) Field of Classification Search
CPC ........................................ G06Q 20/322–3229
See application file for complete search history.

(56) References Cited

U.S. PATENT DOCUMENTS

| 6,636,965 B1 | 10/2003 | Beyda et al. |
| 6,868,498 B1 | 3/2005 | Katsikas |

(Continued)

FOREIGN PATENT DOCUMENTS

| CA | 3 054 287 C | 7/2022 |
| EP | 2 945 410 A1 | 11/2015 |

(Continued)

OTHER PUBLICATIONS

Examiner Requisition for Canadian Application No. 3,054,287, dated Feb. 9, 2021.

(Continued)

*Primary Examiner* — Jay Huang
(74) *Attorney, Agent, or Firm* — IP Spring

(57) ABSTRACT

In one embodiment, a method includes receiving, by a payment service system (PSS), a payment request from a payment application executing on a device of a sender. The payment request includes a recipient identifier corresponding to a recipient. The sender and recipient have financial accounts associated with the PSS. The method includes determining a similarity score based on a comparison of contact records associated with the device of the sender and contact records associated with a device of the recipient. The method includes, responsive to determining that the similarity score does not satisfy a threshold similarity score, transmitting a confirmation request to the device of the sender to confirm an identity of the recipient. The method includes receiving, from the device of the sender, an approval response to the confirmation request. The method (Continued)

includes, authorizing a payment transaction associated with the payment request based on the approval response.

20 Claims, 6 Drawing Sheets

(56) References Cited

U.S. PATENT DOCUMENTS

| | | | |
|---|---|---|---|
| 7,739,309 | B2 | 6/2010 | Singh et al. |
| 8,332,314 | B2 | 12/2012 | Griffin |
| 8,509,734 | B1 | 8/2013 | Gupta et al. |
| 8,606,703 | B1 | 12/2013 | Dorsey et al. |
| 8,682,297 | B2 | 3/2014 | Chevsky et al. |
| 8,694,313 | B2 * | 4/2014 | Lloyd .................. G10L 15/22 704/231 |
| 8,880,421 | B2 | 11/2014 | Navar et al. |
| 9,275,419 | B1 | 3/2016 | Aguiar Marcano |
| 9,300,643 | B1 | 3/2016 | Doane |
| 9,324,067 | B2 | 4/2016 | Van Os et al. |
| 9,342,831 | B1 | 5/2016 | Davis et al. |
| 9,483,763 | B2 | 11/2016 | Van Os et al. |
| 9,773,212 | B2 | 9/2017 | Hammad |
| 9,917,802 | B2 | 3/2018 | Melzer et al. |
| 9,922,380 | B2 | 3/2018 | Isaacson et al. |
| 9,922,381 | B2 | 3/2018 | Isaacson et al. |
| 9,934,502 | B1 | 4/2018 | Grassadonia et al. |
| 9,947,003 | B2 | 4/2018 | Clark |
| 9,972,318 | B1 | 5/2018 | Kelly et al. |
| 9,992,335 | B2 | 5/2018 | Vijaywargi et al. |
| 10,068,221 | B1 | 9/2018 | Thomas et al. |
| 10,121,176 | B2 | 11/2018 | Buezas et al. |
| 10,296,874 | B1 | 5/2019 | Orth et al. |
| 10,375,438 | B2 | 8/2019 | Chen et al. |
| 10,423,948 | B1 | 9/2019 | Wilson et al. |
| 10,467,615 | B1 | 11/2019 | Omojola et al. |
| 10,810,574 | B1 | 10/2020 | Wilson et al. |
| 10,810,592 | B1 | 10/2020 | Omojola et al. |
| 2004/0225509 | A1 | 11/2004 | Andre |
| 2005/0131813 | A1 | 6/2005 | Gallagher et al. |
| 2005/0273626 | A1 | 12/2005 | Pearson et al. |
| 2006/0053298 | A1 | 3/2006 | Ingerman et al. |
| 2006/0131385 | A1 | 6/2006 | Kim |
| 2007/0011104 | A1 | 1/2007 | Leger et al. |
| 2007/0203836 | A1 | 8/2007 | Dodin |
| 2007/0271342 | A1 | 11/2007 | Brandt et al. |
| 2008/0114834 | A1 | 5/2008 | Miyazaki |
| 2008/0177659 | A1 | 7/2008 | Laccy et al. |
| 2009/0094458 | A1 | 4/2009 | Dionisio |
| 2010/0057859 | A1 | 3/2010 | Shen et al. |
| 2010/0114775 | A1 | 5/2010 | Griffin |
| 2010/0250687 | A1 | 9/2010 | Smith et al. |
| 2010/0332624 | A1 | 12/2010 | Terao |
| 2011/0113029 | A1 | 5/2011 | Kaal |
| 2011/0119155 | A1 | 5/2011 | Hammad et al. |
| 2012/0016678 | A1 | 1/2012 | Gruber et al. |
| 2012/0036042 | A1 | 2/2012 | Graylin et al. |
| 2012/0054102 | A1 | 3/2012 | Schwartz et al. |
| 2012/0221404 | A1 | 8/2012 | Ahmed et al. |
| 2012/0295580 | A1 | 11/2012 | Corner |
| 2012/0310752 | A1 | 12/2012 | Gaddis |
| 2012/0323717 | A1 | 12/2012 | Kirsch |
| 2013/0013499 | A1 | 1/2013 | Kalgi |
| 2013/0018779 | A1 | 1/2013 | Laquerre et al. |
| 2013/0137367 | A1 | 5/2013 | Fisher |
| 2013/0204993 | A1 | 8/2013 | Uribe-Etxebarria Jimenez |
| 2013/0218757 | A1 | 8/2013 | Ramanathan et al. |
| 2013/0275508 | A1 | 10/2013 | Bestmann et al. |
| 2013/0297425 | A1 | 11/2013 | Wallaja |
| 2014/0019352 | A1 | 1/2014 | Shrivastava |
| 2014/0031866 | A1 | 2/2014 | Fuhr et al. |
| 2014/0052633 | A1 | 2/2014 | Gandhi |
| 2014/0058939 | A1 | 2/2014 | Savla |
| 2014/0337207 | A1 | 11/2014 | Zhang et al. |
| 2014/0351126 | A1 | 11/2014 | Priebatsch |
| 2015/0046329 | A1 | 2/2015 | Huxham et al. |
| 2015/0088998 | A1 | 3/2015 | Isensee et al. |
| 2015/0095188 | A1 | 4/2015 | Lee et al. |
| 2015/0127526 | A1 | 5/2015 | Ye et al. |
| 2015/0161605 | A1 | 6/2015 | Aidasani et al. |
| 2015/0269575 | A1 | 9/2015 | Narayanan et al. |
| 2015/0304250 | A1 | 10/2015 | Zomet et al. |
| 2015/0348002 | A1 | 12/2015 | Van Os et al. |
| 2015/0371223 | A1 | 12/2015 | Li et al. |
| 2016/0104133 | A1 * | 4/2016 | Davis .................. G06Q 20/10 705/39 |
| 2016/0117651 | A1 | 4/2016 | Davis |
| 2016/0117665 | A1 | 4/2016 | Davis |
| 2016/0117666 | A1 | 4/2016 | Davis et al. |
| 2016/0117670 | A1 | 4/2016 | Davis |
| 2016/0125371 | A1 | 5/2016 | Grassadonia et al. |
| 2016/0171481 | A1 | 6/2016 | McElmurry, IV et al. |
| 2016/0180316 | A1 | 6/2016 | Wang et al. |
| 2016/0180325 | A1 | 6/2016 | Davis et al. |
| 2016/0224967 | A1 | 8/2016 | Davis et al. |
| 2016/0241542 | A1 * | 8/2016 | Kim .................. H04L 63/083 |
| 2016/0283936 | A1 | 9/2016 | Daniel et al. |
| 2016/0314458 | A1 | 10/2016 | Douglas et al. |
| 2016/0321663 | A1 | 11/2016 | Batlle |
| 2016/0335532 | A1 | 11/2016 | Sanghavi et al. |
| 2016/0360039 | A1 | 12/2016 | Sanghavi et al. |
| 2017/0004588 | A1 | 1/2017 | Isaacson et al. |
| 2017/0011383 | A1 | 1/2017 | Melzer |
| 2017/0046426 | A1 * | 2/2017 | Pearce ................. G06F 16/334 |
| 2017/0063825 | A1 * | 3/2017 | Jeong ................. H04L 63/0876 |
| 2017/0186115 | A1 | 6/2017 | Sheppard et al. |
| 2017/0228584 | A1 | 8/2017 | Studnicka |
| 2017/0262837 | A1 | 9/2017 | Gosalia et al. |
| 2017/0270605 | A1 | 9/2017 | Demark et al. |
| 2017/0308694 | A1 * | 10/2017 | Belavadi ................. G06F 21/45 |
| 2017/0374198 | A1 | 12/2017 | De Silva et al. |
| 2018/0007546 | A1 * | 1/2018 | Anderson ............... H04L 67/10 |
| 2018/0218356 | A1 | 8/2018 | Grassadonia et al. |
| 2018/0309801 | A1 | 10/2018 | Rathod |
| 2021/0019755 | A1 | 1/2021 | Omojola et al. |

FOREIGN PATENT DOCUMENTS

| | | |
|---|---|---|
| WO | 2017/103326 A1 | 6/2017 |
| WO | 2018/140272 A1 | 8/2018 |

OTHER PUBLICATIONS

"Facebook Messenger Promotes P2P Payments," BI Intelligence—Finance, dated Sep. 23, 2016, Business Insider, pp. 1-4.

"PayPal's first payments bot is a Slack app," TechCrunch, dated Feb. 7, 2017, retreived from Internet URL: https://techcrunch.com/2017/02/07/paypals-first-payments-bot-is-a-slack-app/, on Jun. 30, 2017, pp. 1-8.

"The latest from Apple and Google in mobile AP Is for developing native applications," BBVAOpen4u.com, dated Nov. 10, 2016, Retrieved from Internet URL: https://bbvaopen4u.com/en/actualidad/latest-apple-and-google-mobile-apis-developing-native-applications, on May 7, 2018, pp. 1-9.

Barbosa, G., "Square Cash update includes promised Messages app plus Siri integration," 9to5 Mac, dated Sep. 13, 2016, Retrieved from Internet USL: https://9to5mac.com/2016/09/13/square-cash-messages-app-siri/, on May 9, 2018, pp. 1-3.

Chowdhry, A., "Apple Patent Highlights An iMessage Payment Service," Forbes Tech, dated Jan. 7, 2016, Retrieved from Internet URL: https://www.forbes.com/sites/amitchowdhry/2016/01/07/apple-pay-with-imessage/#6c352c3a190b, on May 9, 2018, pp. 1-3.

Constine, J., "Facebook Introduces Free Friend-To-Friend Payments Through Messages," TechCrunch, dated Mar. 17, 2015, Retrieved from Internet URL: https://techcrunch.com/2015/03/17/facebook-pay/, on Oct. 4, 2017, pp. 1-5.

Constine, J., "Facebook Messenger Adds Group Chat Polls and AI Payment Suggestions," TechCrunch, dated Sep. 22, 2016, Retrieved from Internet URL: https://techcrunch.com/2016/09/22/messenger-polls/, on Oct. 4, 2017, pp. 1-3.

Crook, J., "Apple launches iMessage Apps so third-party devs can join your convos," TechCrunch, dated Jun. 13, 2016, Retrieved from

(56) References Cited

OTHER PUBLICATIONS

Internet URL: https://techcrunch.com/2016/06/13/apple-launches-imessage-apps-so-third-party-devs-can-get-join-your-convos/, on May 9, 2018, pp. 1-2.
Fuhrmeister, C., "Apple Wants to Help You Split the Check With iMessage," Eater, dated Jun. 15, 2016, Retrieved from Internet URL: https://www.eater.com/2016/6/15/11950264/splitting-checks-imessage-apple-square, on Oct. 4, 2017, pp. 1-2.
Goel, V., "Apple to Offer App Developers Access to Siri and iMessage," The New York Times, dated Jun. 13, 2016, Retrieved from Internet URL: https://www.nytimes.com/2016/06/14/technology/apple-to-offer-app-developers-access-to-siri-and-imessage.html, on May 9, 2018, pp. 1-2.
Austin, P.L., "Apple Just Added One More Way to Repay Your Friends," Lifehacker, dated Jun. 5, 2017, pp. 1-3.
Madore, P.H., "Apple Patent Reveals Siri-Assisted iMessage P2P Payments Platform," Hacked: Hacking Finance, Artificial Intelligence, dated Nov. 17, 2016, Retrieved from Internet URL: https://hacked.com/apple-patent-reveals-siri-assisted-imessage-p2p-payments-platform/, on Oct. 4, 2017, pp. 1-5.
Peckham, J., "Apple is opening up Siri, i Message and Maps—here's why that's a great thing," Tech Radar, dated Jun. 13, 2016, Retrieved from Internet URL: https://www.techradar.com/news/phone-and-communications/mobile-phones/apple-is-opening-up-siri-imessage-and-maps-here-s-why-that-s-a-great-thing-1323325, on May 9, 2018, pp. 1-4.
Quoc, M., "11 Examples of Conversational Commerce and Chatbots," Chatbots Magazine by Octane AI, dated May 31, 2016, Retrieved from Internet URL: https://chatbotsmagazine.com/11-examples-of-conversational-commerce-57bb8783d332, on May 7, 2018, pp. 1-24.
Rao, L., "Square Cash Users Will Be Able to Send Money Via Apple iMessage," Fortune, Jun. 13, 2016, Retrieved from Internet URL: http://fortune.com/2016/06/13/square-cash-apple/, on May 9, 2018, pp. 1-6.
Statt, N., "Facebook's AI Assistant Will Now Offer Suggestions Inside Messenger," The Verge, dated Apr. 6, 2017, Retrieved from Internet URL: https://www.theverge.com/2017/4/6/15200836/facebook-messenger-m-suggestions-ai-assisant, on Oct. 4, 2017, pp. 1-5.
Tepper, F., "You Can Now Send Your Friends Money Inside iMessage," TechCrunch, dated Jun. 5, 2017, Retrieved from Internet URL: https://techcrunch.com/2017/06/05/you-can-now-send-your-friends-money-inside-imessage/, on Oct. 4, 2017, pp. 1-3.
Wagner, K., "Facebook Messenger Adds Peer-to-Peer Payments Feature," Recode, dated Mar. 17, 2015, Retrieved from Internet URL: https://www.recode.net/2015/3/17/11560350/facebook-messenger-adds-peer-to-peer-payments-feature, on Oct. 4, 2017, pp. 1-3.
Yeung, K., "Facebook Adds Group Payments to Messenger," VentureBeat, dated Apr. 11, 2017, Retrieved from Internet URL: https://venturebeat.com/2017/04/11/facebook-adds-group-payments-to-messenger/, on Oct. 4, 2017, pp. 1-3.
Yeung, K., "Facebook Messenger Gets Polls and Now Encourages Peer-to-Peer Payments," VentureBeat, dated Sep. 22, 2016, Retrieved from Internet URL: https://venturebeat.com/2016/09/22/facebook-messenger-gets-polls-and-a-new-way-to-get-you-to-send-money/, on Oct. 4, 2017, pp. 1-5.
Chung et al., "Enhancing User Experiences by Exploiting Energy and Launch Delay Trade-Off of Mobile Multimedia Applications", ACM Transactions on Embedded Computing Systems, vol. 12, No. 1, Mar. 2013, pp. 37:1-37:19.
Non-Final Office Action dated Mar. 28, 2017, for U.S. Appl. No. 15/419,921, of Grassadonia, B., et al., filed Jan. 30, 2017.
Final Office Action dated Aug. 31, 2017, for U.S. Appl. No. 15/419,921, of Grassadonia, B., et al., filed Jan. 30, 2017.
Non-Final Office Action dated Oct. 26, 2017, for U.S. Appl. No. 15/640,245, of Wilson, J., et al., filed Jun. 30, 2017.
Notice of Allowance dated Nov. 16, 2017, for U.S. Appl. No. 15/419,921, of Grassadonia, B., et al., filed Jan. 30, 2017.
Non-Final Office Action dated Mar. 22, 2018, for U.S. Appl. No. 14/946,544, of Omojola, A., et al., filed Nov. 19, 2015.
Non-Final Office Action dated Apr. 5, 2018, for U.S. Appl. No. 14/871,576, of Omojola, A., et al., filed Sep. 30, 2015.
Final Office Action dated May 16, 2018, for U.S. Appl. No. 15/640,245, of Wilson, J., et al., filed Jun. 30, 2017.
Final Office Action dated Sep. 21, 2018, for U.S. Appl. No. 14/946,544, of Omojola, A., et al., filed Nov. 19, 2015.
Non-Final Office Action dated Oct. 4, 2018, for U.S. Appl. No. 15/640,245, of Wilson, J., et al., filed Jun. 30, 2017.
Final Office Action dated Oct. 5, 2018, for U.S. Appl. No. 14/871,576, of Omojola, A., et al., filed Sep. 30, 2015.
Advisory Action dated Jan. 25, 2019, for U.S. Appl. No. 14/946,544, of Omojola, A., et al., filed Nov. 19, 2015.
Notice of Allowance dated May 14, 2019, for U.S. Appl. No. 15/640,245, of Wilson, J., et al., filed Jun. 30, 2017.
Notice of Allowance dated Jun. 14, 2019, for U.S. Appl. No. 14/871,576, of Omojola, A., et al., filed Sep. 30, 2015.
Non-Final Office Action dated Jul. 3, 2019, for U.S. Appl. No. 15/419,940, of Grassadonia, B., et al., filed Jan. 30, 2017.
Non-Final Office Action dated Oct. 2, 2019, for U.S. Appl. No. 15/638,223, of Wilson, J., et al., filed Jun. 29, 2017.
Non-Final Office Action dated Oct. 3, 2019, for U.S. Appl. No. 14/946,544, of Omojola, A., et al., filed Nov. 19, 2015.
Final Office Action dated Apr. 17, 2020, for U.S. Appl. No. 14/946,544, of Omojola, A., et al., filed Nov. 19, 2015.
Notice of Allowance dated Jun. 4, 2020, for U.S. Appl. No. 15/638,223, of Wilson, J., et al., filed Jun. 29, 2017.
Notice of Allowance dated Jun. 4, 2020, for U.S. Appl. No. 14/946,544, of Omojola, A., et al., filed Nov. 19, 2015.
Notice of Allowance dated Jun. 11, 2020, for U.S. Appl. No. 15/419,940, of Grassadonia, B., et al., filed Jan. 30, 2017.
Notice of Allowance dated Jun. 24, 2020, for U.S. Appl. No. 15/419,940, of Grassadonia, B., et al., filed Jan. 30, 2017.
Notice of Allowance dated Jul. 29, 2020, for U.S. Appl. No. 15/419,940, of Grassadonia, B., et al., filed Jan. 30, 2017.
Notice of Allowance dated Aug. 7, 2020, for U.S. Appl. No. 15/638,223, of Wilson, J., et al., filed Jun. 29, 2017.
Notice of Allowance dated Sep. 21, 2020, for U.S. Appl. No. 15/419,940, of Grassadonia, B., et al., filed Jan. 30, 2017.
Partial International Search Report for International Application No. PCT/US2018/014126, dated May 7, 2018.
International Search Report and Written Opinion for International Application No. PCT/US2018/014126, dated Jul. 16, 2018.
Examination Report No. 1 for Australian Application No. 2018213955, dated Jun. 15, 2020.
Examination Report No. 2 for Australian Application No. 2018213955, dated May 28, 2021.
Notice of Acceptance for Australian Application No. 2018213955, dated Jun. 24, 2021.
Notice of Grant for Australian Application No. 2018213955, dated Oct. 21, 2021.
Pre interview First Office Action dated Mar. 17, 2022, for U.S. Appl. No. 17/072,717, of Grassadonia, B., et al., filed Oct. 8, 2020.
Notice of Allowance for Canadian Application No. 3,054,287, dated Jan. 7, 2022.
First Action Interview—Office Action dated Jun. 1, 2022, for U.S. Appl. No. 17/072,717, of Wilson, J., et al., filed Oct. 16, 2020.
Final Office Action dated Sep. 16, 2022, for U.S. Appl. No. 17/072,717, of Wilson, J., et al., filed Oct. 16, 2020.

\* cited by examiner

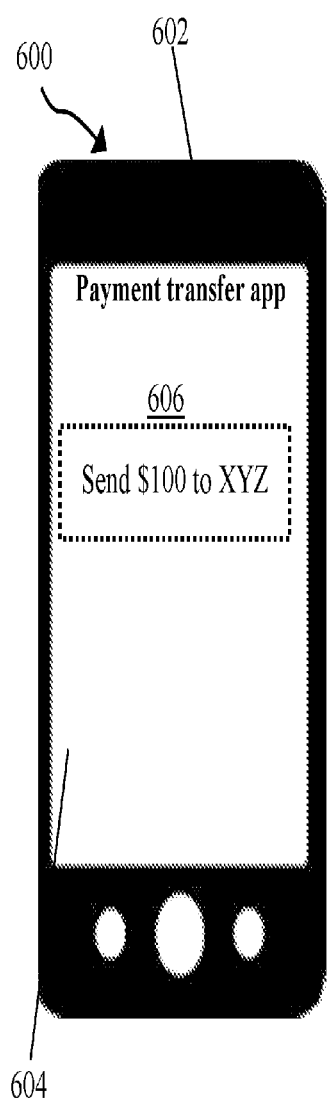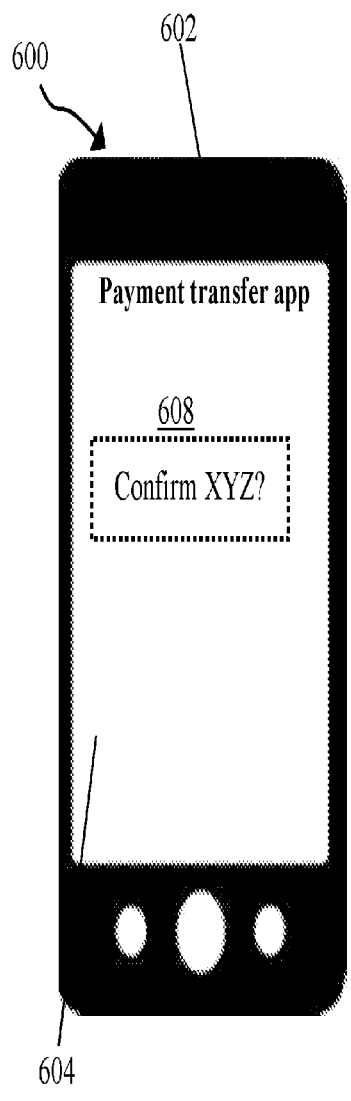
*FIG. 6A*  *FIG. 6B*  *FIG. 6C*

CONTACTS FOR MISDIRECTED PAYMENTS AND USER AUTHENTICATION

PRIORITY

This application is a continuation under 35 U.S.C. § 120 of U.S. patent application Ser. No. 15/419,940, filed 30 Jan. 2017.

BACKGROUND

Users can make payments through variety of methods, such as credit cards and cash, but these payment methods may involve risk. For instance, in certain environments, it may be unsafe to carry sizeable amounts of cash or other valuables. Furthermore, using credit cards or online payment methods may require inputting financial information (e.g., bank account numbers, routing number), and identification verifications (e.g., social security, home address).

In recent times, mobile phones have become a more integral in conducting a transaction. Because mobile phones are personal, trusted devices, the mobile phones can now be associated with a banking line of credit or checking account. Also, when it is dangerous to carry sizeable amounts of cash or other valuables, a mobile phone offers additional protection to its owner because, if it is stolen, only the current market value of the mobile phone is lost and any prepaid value, associated accounts, and credit card numbers may remain protected. However, carrying and using a mobile phone in place of a traditional wallet is not without its own risks. In some circumstances, the mobile credit accounts are usually linked to a phone number of the mobile phone number. In such cases, the phone number may get exchanged and/or recycled, and when a user attempts to log into their mobile credit account from a different phone number and/or a different mobile device, additional levels of information about that user's account may be desired to ensure account security in order to prevent accidental account takeovers by unauthorized persons who may have obtained the recycled phone number.

DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the present disclosure.

FIG. 6A illustrates a graphical user interface for presenting a mobile payment request, according to an embodiment.

FIG. 6B illustrates a graphical user interface for presenting a mobile payment request, according to an embodiment.

FIG. 6C illustrates a graphical user interface for presenting a mobile payment request, according to an embodiment.

DESCRIPTION

Figure 1:
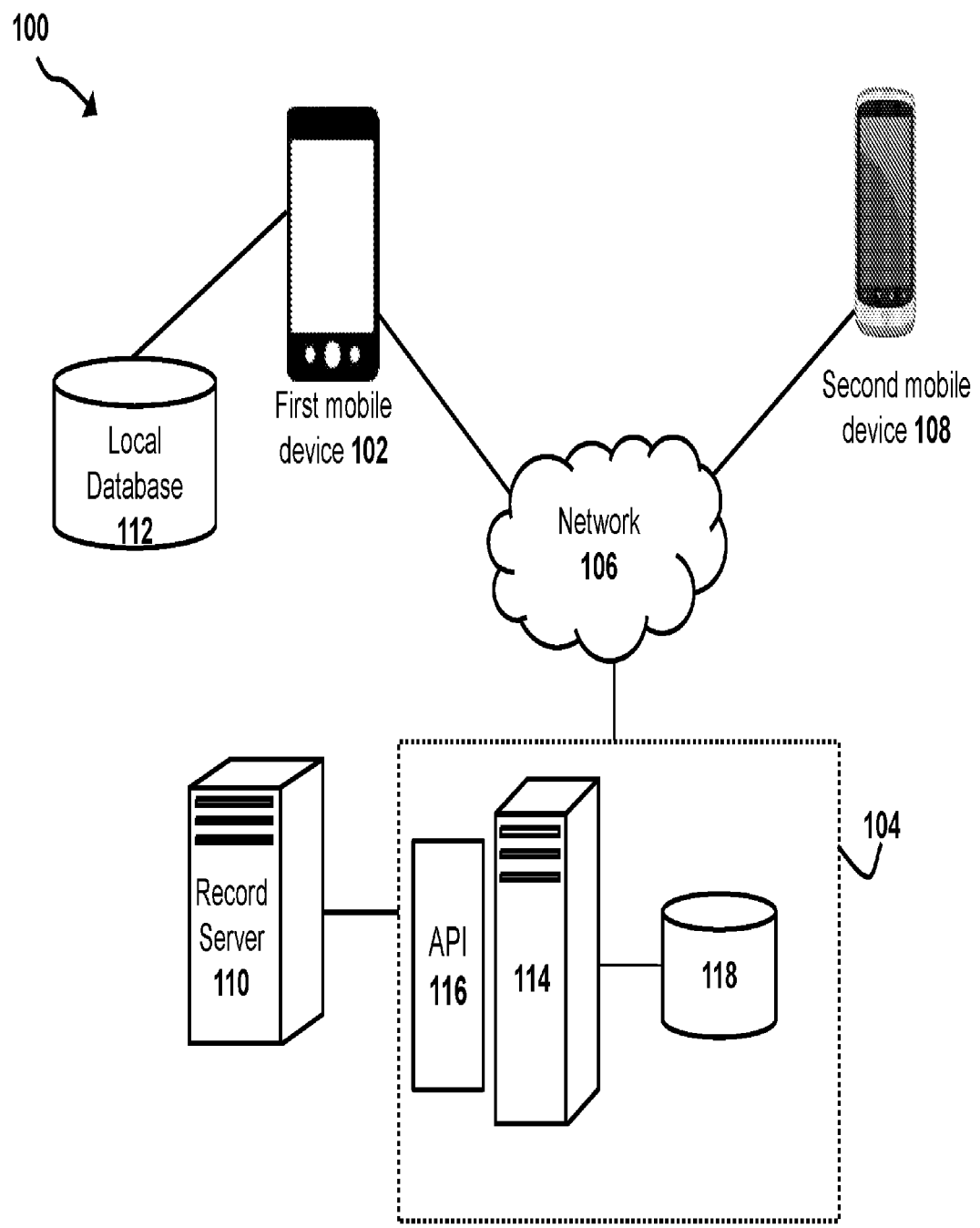
FIG. 1 illustrates an example of a system for processing mobile payments, according to an embodiment.

Disclosed herein are systems and methods capable of addressing the above-described shortcomings and may also provide any number of additional or alternative benefits and advantages. For example, the various embodiments described herein generally relate to methods and systems that provide an efficient and secure technique for mobile payment transfer on a mobile device, based on authenticating a user (payor) of the mobile device, by multi factor authentication. In some embodiments, the methods and systems described herein use mobile devices that can execute a payment transfer application that facilitates a transfer of money between accounts. A user can then command the payment transfer application running on the mobile device to send money to a recipient account via a payment processing system that runs the payment transfer application. Although described herein as taking the form of a messaging application on mobile devices, it should be appreciated that some embodiments are not limited to such a form factor. For instance, in some instances, users may access the payment processing system and services via a website, where the payment processing system may comprise a webserver in communication with an application server configured to perform the various processes and tasks described herein. The user may access the payment processing system through a native application installed on the user's local device that was downloaded from a server of the payment processing system. Additionally or alternatively, the user may access the payment processing system through an Internet browser application through which the user may provide various process instructions to a webserver of the payment processing system. Other embodiments of the payment transfer application may include a messaging application executed by a mobile device through which the user interfaces with the payment processing system via a chat messaging interface on the user's mobile device. The payment processing system may then perform the various tasks and processes described herein, based upon the chat-based (e.g., SMS, iMessage®) instructions received from the user's mobile device.

It should be appreciated that as payments and transactions are described herein, the values and currencies associated with such transactions are not limited to a certain form or type of currency; the type of currency may be ordinary form of cash currency (e.g., dollars, euros, rupees) and the form of currency may be a cash currency or may be digital currency, sometimes referred to as cryptocurrency, such as Bitcoin, Ripple, or the like. In some instances, the type of currency transmitted on a sending-side of a transaction (e.g., dollars) may be different from the type of currency received on the recipient-side of the transaction (e.g., euros). The servers of the payment processing system may be configured to automatically convert the transaction value according to the respective transaction currency types or forms, according to a conversion factor, which the server may receive from one or more external data sources or may be programmed by an administrative user. Similarly, the server may have installed and execute a software application that is required to conduct transactions using a digital currency, such as executable routines that update a blockchain ledger to indicate an exchange in ownership over the converted digital currency value.

When a user having an account associated with a payment transfer application uses a new mobile device to execute the payment transfer application to conduct a transaction with that account, the user is required to enter login details to access the payment transfer application on the new mobile device. Upon the entry of the login details by the user, a payment processing system that runs the payment transfer application may execute a layer of security protocols to verify an identity of the user. For instance, in a first layer of security, upon entry of the login information in the payment transfer application, the user may receive a code on the new mobile device and/or e-mail account of the user. The user enters the code into a user interface of the payment transfer application on the new mobile device to verify that the account being accessed by the user belongs to the user. In a second layer of security, a payment processing system may send to the user a request to access to a contact list on the new mobile device. Upon approval by the user of the new mobile device, the payment processing system receives the contact list from the new mobile device. The payment processing system may then compare the contact list obtained from the new mobile device with a contact list retrieved from old mobile device of the user. The contact list of the old mobile device is stored in a user record within the payment processing system. When the results of a comparison show a significant overlap (e.g., a pre-determined percentage of contacts in both the contact lists are same), the payment processing system allows the user to access the payment transfer application of the new mobile device.

A new mobile device may generate an encrypted version of contacts stored in a memory of the new mobile device and then transmit the encrypted version of the contacts to a payment processing system. The new mobile device may use any suitable encryption technique to encrypt the contacts. In one embodiment, the encrypted version of contacts provide a hash value for each contact in the contact list of the new mobile device, and thus there is a hash value for each contact. The payment processing system may then compare the hash value of each contact on new mobile device with a hash value of contacts of the old mobile device of the user to determine if there is a significant overlap. Upon determining the significant overlap between the hash values of the new and old contacts, the payment processing system may authenticate the user. Moreover, by exchanging and storing hash values of contacts, contact lists, and/or transaction data, as opposed to the actual data, the payment processing system and administrators of the payment processing system are unable to view or otherwise access the actual data entries in a plaintext format, thereby protecting the privacy of the data yet still enabling the capability of comparing the contact data and/or transaction data.

In one example, a payment transfer application authenticates a user having two mobile devices, where the user is attempting to perform a transaction on the second mobile device using the payment transfer application. On the first (e.g., an initial) mobile device, the payment transfer application automatically generates hash values representing contact records stored on the first mobile device. The first mobile device transmits the hash values representing the contact records stored in the first mobile device to a server of a payment processing system. Upon the receipt of the hash values representing the contact records stored in the first mobile device from the first mobile device, the server may store the hash values representing the contact records stored in the first mobile device in a database of the payment processing system. When the user attempts to use the second mobile device (e.g., a later-activated device) for executing the payment transfer application, the payment transfer application on the second mobile device generates an authentication request. The second mobile device then transmits the authentication request to the server. Along with the authentication request, the second mobile device transmits hash values representing contact records stored in the second mobile device. Upon the receipt of the hash values representing the contact records stored in the second mobile device by the server, the server compares the hash values representing the contact records stored in the second mobile device with the hash values representing the contact records stored in the first mobile device. Upon determining that the hash values received from the second mobile device satisfy an overlap threshold with the hash values received from the first mobile device, the server grants access to the user to access the payment transfer application via the second mobile device.

In some implementations, the mobile device may transmit to the payment processing server a unique user identifier (user ID) for a recipient-user. The server may then generate a hash value for the recipient-user and then matches the hash value of the user ID with a stored hash value for the recipient-user received from the user contacts of the sending-user's mobile device.

In another example, a payment transfer application verifies a payment destination account for an outgoing transaction request initiated by a mobile device. In this example, a user is running a payment transfer application on the mobile device and requests the outgoing transaction (payment of funds from an account) using the payment transfer application. The payment transfer application of each mobile device in the system generates hash values representing contact records stored on the mobile devices. Each mobile device transmits the hash values to a server of a payment processing system. Upon the receipt of the hash values from a mobile device, the server may store the hash values in a database of the payment processing system. The hash values are associated with a user record of each respective associated with each respective mobile device stored in the database. The user records contain a history of payment requests indicating a respective recipient hash value associated with each respective payment request in the history of payment requests. When the user generates a payment request from the mobile device, the mobile device transmits the payment request to the server. The payment request contains a recipient contact and a corresponding hash value. Upon receiving the payment request from the mobile device, the server compares the recipient contact and the corresponding hash value with the hash values from the mobile device and the hash values in the history of payment requests stored in the user record. Upon determining that the recipient hash value in the payment request is not stored in the hash values from the mobile device and also not stored in the history of payment requests, the server may generate and transmit to the mobile device a message requesting confirmation of an identity of the recipient. Upon receiving a positive response from a user to the confirmation request, the server will then approve the payment request of the user and the payment will be transferred to the recipient.

In some instances, the improvements upon the login process described herein address shortcomings in the prior art, such as the. For example, logging into the system using prior art technologies may result in substantial back-and-forth network traffic and data processing obligations, due to the needs for system hardware components to process passwords or other credentials. However, the systems and methods described herein provide a user authentication methodology that may ease the burden on data processing and reduce the amount of network traffic exchanges between the network devices. As another example, the numerous amount of login attempt from users and external systems may establish a backlog or present a substantial timing burden when authenticating users or systems. The systems and methods of using hashed values of data stored on a user device (e.g., contacts in a contact list) may provide a significantly faster means of authenticating users, as improvement upon using user credentials or biometric inputs. This improve the speed at which login attempts are processed, which, in turn, reduces the backlog of authentication requests, and thus improves response time to other user login attempts and third-party software attempting to access to the system. In order to achieve such benefits, data stored locally on a user device should be used for authentication purposes. However, this data could be sensitive or large, which raises concerns of confidentiality and data processing sizes, and threatens to mitigate the potential benefits described herein. As such, it is often desirable to generate and use a hash value of the data entries to be processed for authentication purposes (e.g., hash value of each contact entry in contacts list). Using hash values could potentially resolve the confidentiality concerns by acting as cryptographic scheme, and could reduce the amount of data being exchanged and processed as the resulting hash value could be a smaller byte size compared to the original data entry. Let's add a few sentences here discussing the technical advantages and improvements over prior methods The present disclosure is described in detail with references to embodiments illustrated in the drawings. Other embodiments may be used or other changes may be made without departing from the spirit or scope of the present disclosure. The illustrative embodiments described in the detailed description are not meant to be limiting of the subject matter presented here. Various embodiments will now be described in further detail. The following description provides specific details for a thorough understanding and enabling description of these embodiments. One skilled in the relevant art will understand, however, that the embodiments discussed herein may be practiced without many of these details. Likewise, one skilled in the relevant art will also understand that the embodiments may include many other obvious features not described in detail herein. Additionally, some well-known structures or functions may not be shown or described in detail below, to avoid unnecessarily obscuring the relevant description.

FIG. 1 illustrates an example of a system 100 for processing mobile payments, according to an embodiment. The system 100 may include a first mobile device 102, a payment processing system (PPS) 104, a network 106, a second mobile device 108, a record server 110, a local database 112 of the first mobile device 102, and a second local database 109 of the second mobile device 108. The payment processing system PPS may include a PPS server 104, an Application Programming Interface (API 116), and a PPS database 118.

In some embodiments, the system 100 can use multiple mobile devices (such as the first mobile device 102 and or the second mobile device 108) to request that money be transferred over bank account or debit card networks. The system 100 includes a sender device, such as the first mobile device 102 and/or the second mobile device 108 connected to the network 106, where the sender device is capable of running an a payment processing application of the PPS system 104. A user may use the first mobile device 102 and/or the second mobile device 108 to send a payment (money) through the PPS system 104 to a recipient account.

The first mobile device 102, the PPS system 104, and the second mobile device 108 are connected to each other and communicate via the network 106. The network 106 may be a medium that also connects the PPS database 118 and the record server 110 of the system 100. The examples of the network 106 may include, but are not limited to, private or public LAN, WLAN, MAN, WAN, and Internet. The network 106 may include both wired and wireless communications according to one or more standards and/or via one or more transport mediums. The communication over the network 106 may be performed in accordance with various communication protocols such as Transmission Control Protocol and Internet Protocol (TCP/IP), User Datagram Protocol (UDP), and IEEE communication protocols. In one example, the network 106 may include wireless communications according to Bluetooth specification sets, or another standard or proprietary wireless communication protocol. The network 106 may also include communications over a cellular network, including, e.g. a GSM (Global System for Mobile Communications), CDMA (Code Division Multiple Access), or EDGE (Enhanced Data for Global Evolution) network.

The first mobile device 102 and/or the second mobile device 108 may be any portable or non-portable computing device with a processor/microcontroller and/or any other electronic component that performs one or more operations according to one or more programming instructions. The examples of the first mobile device 102 and/or the second mobile device 108 include, but are not limited to, a cellular phone, a tablet computer, a smart watch, a personal data assistant, a gaming console, or personal computer. The first mobile device 102 and/or the second mobile device 108 are capable of communicating with the PPS system 104 through the network 104 using wired or wireless communication capabilities.

The first mobile device 102 and/or the second mobile device 108 may include one or more input/output devices configured to allow user interaction with one or more programs configured to communicate with the PPS system 104 to perform financial payment transactions. In some embodiments, the user may have the payment transfer application installed on the first mobile device 102 from which user access and interact with the PPS system 104 to perform financial transactions. The payment transfer application may be a software stack running on an operating system (OS) of the first mobile device 102. The payment transfer application of the PPS system 104 may have a protocol layer and a user interface layer ("UI") where each layer may be responsible for specific functions. The protocol layer of the payment transfer application of the PPS system 104 may communicate with the OS of the first mobile device 102 and manages the connections of the first mobile device 102 over the communication network 106. The protocol layer may also communicate with the user interface layer and may be arranged to control the user interface layer to present information to the user via the user interface of the payment transfer application on the first mobile device 102 and to receive information from the user via the user interface of the payment transfer application on the first mobile device 102.

In some embodiments, the first mobile device 102 may run a web browser that accesses and presents a payment transfer web application to be executed by a processor of the first mobile device 102 or the PPS server 114 of the PPS system 104 and allows the user to perform financial transactions using the payment transfer web application on the first mobile device 102. In some embodiments, the first mobile device 102 may execute an application outside of a web browser, for example, an operating system-specific payment transfer application that accesses and presents information processed by the processor of the first mobile device 102 or the PPS system 104 to perform financial transactions.

The first mobile device 102 stores a list of contacts. The first mobile device 102 may also store data related to transactions performed by the user using the payment transfer application. The list of contacts and/or transaction data may be stored in the local database 112 associated to the first mobile device 102. In some embodiments, data such as the list of contacts and/or transaction data transmitted over the suitable communication network 106 from the first mobile device 102 to the local database 112 may be formatted and/or encrypted in accordance with a variety of different protocols such as security and communication protocols. For example, all or a portion of the communication network 106 may be a packet-based, Internet Protocol (IP) network that communicates the data from the first mobile device 102 to the local database 112 in Transmission Control Protocol/Internet Protocol (TCP/IP) packets. In one example, the payments processed on the first mobile device 102 using the payment transfer application may be formatted, as transaction data in accordance with a formatting specification or protocol expected by the local database 112 and/or the PPS system 104, and then the formatted data may be transmitted by the first mobile device 102 to the local database 112. In another example, a processor of the first mobile device 102 may generate an encrypted value for each contact in the list of contacts, or otherwise translate the list of contacts as hash records, which may then be stored into the local database 112 and/or the PPS database 118.

The local database 112 may be hosted on any mobile device (such as the first mobile device 102). The local database 112 is capable of storing the transaction data and the list of contacts in plaintext format and/or encrypted version. Moreover, by exchanging and storing hash values of contacts, contact lists, and/or transaction data, as opposed to the actual data, the PPS system 104 and administrators of the PPS system 104 may be unable to view the actual data entries in a plaintext format, thereby protecting the privacy of the data but still enabling the capability of comparing the contact entries and/or transaction data. The local database 112 may be in communication with a processor, where the processor is capable of executing the various commands of the database management system. In some embodiments, the local database 112 may be part of the first mobile device 102. In some embodiments, the local database 112 may be a separate component in communication with the first mobile device 102 and the PPS system 104.

The local database 112 and/or the PPS database 118 may be in communication to each other via the network 106 and include a non-transitory machine-readable storage media capable of receiving, storing, updating, and/or querying contacts and transaction records stored in the local database 112. The local database 112 and/or the PPS database 118 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the PPS server 114 and/or the first mobile device 102.

In some embodiments, the memory of the local database 112 and/or the PPS database 118 may be a non-volatile storage device for storing data and instructions to be used by a processor of the first mobile device 102 and/or the PPS server 114. The memory may be implemented with a magnetic disk drive, an optical disk drive, a solid state device, or an attachment to a network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory.

In some embodiments, the memory of the local database 112 and/or the PPS database 118 may be a temporary memory, such that a primary purpose of the memory is not long-term storage. The memory in some examples, described as a volatile memory, meaning that the memory do not maintain stored contents when the first mobile device 102 is turned off. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

In some embodiments, a processor operates the PPS system 104. The processor processes transfers conducted between the sender and recipient mobile or other electronic devices. The sender device can send money to the recipient device via the payment processing application of the PPS system 104. The payment processing system 104 can, based on the transfer request, transfer money between a sender card account to a recipient card account, and can communicate with the sender and recipient mobile or other electronic devices. The PPS system 104 may include one or more PPS servers 114, at least some of which can handle secure transactions to process all transactions with the sender and recipient mobile or other electronic devices.

One or more accounts (e.g., debit or credit card accounts) can be associated with a payment processing application installed on the first mobile device 102. An account can be a financial account managed by a card issuer and can be associated with a card number. In some implementations, the one or more accounts are stored at the PPS server 114. The PPS system 104 may communicate with a record server 110 of a debit card payment network. In some implementations, the PPS system 104 may communicate with a record server 110 of a credit card payment network, e.g., over the network 106 used to communicate with the sender device such as the first and the second mobile devices 102, 108 or over a different communication network. In some embodiments, to transfer money between the sender and the recipient, the PPS system 104 may identify debit card accounts, e.g., stored at the PPS servers 114, for the sender. The PPS system 104 may submit a request to an appropriate card issuer, e.g., the sender's card issuer, to transfer money. The appropriate card issuer may receive and process the request by transferring money to the appropriate card account. In some embodiments, to transfer money between the sender and the recipient, the PPS system 104 may receive a payment amount by processing a card, e.g., a credit card or a debit card, of the sender and hold the payment amount. The PPS system 104 may push the payment amount to a debit account of the recipient. Instead of holding the payment amount, the PPS system 104 may also forward the payment once the recipient links an account with the PPS system 104.

The PPS server 114 may be positioned between the first mobile device 102, the second mobile device 108, and the record server 110. The PPS server 114 is part of the PPS system 104, which may also include the Application Programming Interface (API) 116 and the PPS database 118. The PPS server 114 may use the API 114 to communicate with the mobile devices 102, 108 belonging to the user or the recipient over the network 106. The PPS database 118 may include information such a user profile, phone number, contacts lists, hash values of contacts lists, and account numbers of the user. In the exemplary system 100 seen in FIG. 1, the PPS server 114 may receive transmissions regarding payment requests that occur between a user using the first and the second mobile devices 102, 108 and the record server 110. In some embodiments, upon receiving a payment request from the user, and generating a payload, the PPS server 114 may forward the transaction to the record server 110 that is associated with a financial institution. In some embodiments, the PPS server 114 may directly contact the financial institute in order to facilitate the payment request and transaction.

The record server 110 may be hosted by a financial institute or a third party that provides a service to the financial institute. The record server 110 may maintain information regarding the balance of an account maintained by the user at the financial institute. Certain parties, such as the user who is an account owner or an administrator of the PPS system 104, may assume certain risks that an account holder does not have sufficient funds to fund a transaction, until the record server 110 authorizes the transaction. Upon receiving a payment request, the server 114 may forward associated information to the record server 110, which maintains an account corresponding to the balance of the user. In some embodiments, the financial institute may also generate an authorization response to forward to the record server 110, back through other devices in a payment stream and eventually to the PPS server 114 to confirm that the user or the recipient may complete the payment transaction. The PPS server 114 may either receive authorization from the financial institute or create a custom authorization or anti-fraud procedure in order to authorize the payment requests.

The PPS server 114 and/or the record server 110 may include one or more processors to control the operations of the PPS system 104. In some embodiments, a single processor may be employed. In some embodiments, a plurality of processors may be employed for configuring the PPS system 104 as a multi-processor system. The processor may include suitable logic, circuitry, and interfaces that are operable to execute one or more instructions to perform data transfer and other operations. The processor may be realized through a number of processor technologies known in the art. The examples of the processor include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor. The processor may also include a Graphics Processing Unit (GPU) that executes the set of instructions to perform one or more processing operations.

During operation of the system 100, a user may access a payment transfer application of the PPS system 104 on the first mobile device 102. Initially, the user may not have an account on the payment transfer application, and the user may register on the payment transfer application. The user may register on the payment transfer application installed on the first mobile device 102 by generating a username using a full name, a phone number, and/or e-mail address to access the account.

The first mobile device 102 may contain a list of contacts of the user in its phonebook directory. The list of contacts may include one or more of: name of each contact, a phone number of each contact, a username associated to the contact's payment transfer application, e-mail address of each contact, and bank account details for each contact. The list of contacts and their corresponding details may be stored on the first mobile device 102 or in the local database 112 linked to the first mobile device 102.

In some embodiments, a processor of the first mobile device 102 may transmit the list of contacts on the first mobile device 102 to the PPS server 114 of the PPS system 104. In one instance, a processor of the first mobile device 102 may transmit a list of contacts to the PPS server 114 when the user of the first mobile device 102 registers an account on the payment transfer application. In another instance, a processor of the first mobile device 102 may initially transmit a list of contacts to the PPS server 114 when the user of the first mobile device 102 registers an account on the payment transfer application, and subsequently further transmits an updated list of contacts from the first mobile device 102 to the PPS server 114 after predefined intervals of time (for example, every one week, or one month). In yet another instance, a processor of the first mobile device 102 may initially transmit the list of contacts to the PPS server 114 when the user of the first mobile device 102 registers an account on the payment transfer application, and subsequently further transmits each new contact added in a phone book of the first mobile device 102 by the user of the first mobile device 102 to the PPS server 114 as soon as the new contact is added in the phone book of the first mobile device 102.

In some embodiments, in order to transfer the list of contacts from the first mobile device 102 to the PPS server 114, a processor of the first mobile device 102 may retrieve the list of contacts from the local database 112 and then transmit the list of contacts to the PPS server 114. In some embodiments, in an effort to ensure privacy in P2P systems such as the system 100, because the communication in the P2P systems is controlled by the users of the system 100, not by a centralized network operator, the first mobile device 102 creates hash values for each contact of the list of contacts stored in first mobile device 102. The generated hash values for each contact of the list of contacts are sent between the first mobile device 102 and the server 114 rather than the details of the contacts indicated by the hash values, such that first mobile device 102 avoids the need to reveal the details of the list of contacts to the PPS server 114. In some embodiments, the first mobile device 102 may also store the hash values associated to each contact of the list of the contacts in the local database 112 along with the list of contacts.

The first mobile device 102 may generate a hash value for each contact in the list of contacts using a hashing technique. In some embodiments, the hashing technique compacts information to identifiers (hash values) in such a way that the content of the information in the contacts and/or the order of the information in contacts in the list of contacts are taken into account in generating hash values from a list of contacts by the first mobile device 102. In some embodiments, a single hash value may correspond to one contact item, such that the identification of matching hash values equates to an identification of matching contacts identified by the hash values. In some embodiments, using the hash values rather than the contacts details themselves reduces the amount of data transmitted over the network 106 and hides the content of the contacts as well. The hash values may be generated using a one-way hashing algorithm executed by the first mobile device 102 where the hash functions are non-reversible, meaning that the original content from which the hash was calculated cannot be recreated from the hash value, thereby protecting the original content details of the contact. It can therefore be seen that using the hash values provides a level of security to protect against the disclosure of details of the contact from the first mobile device 102 to the PPS server 114.

In some embodiments, the user may use a new mobile device, such as a second mobile device 108, to access its account on a payment transfer application. In such a case, the user may install the payment transfer application on the second mobile device 108. The PPS server 114 may then receive a request from user and/or the second mobile device 108 for authorizing the second mobile device 108 to become a trusted device for access to a payment transfer application service. The request may be generated in any suitable manner. For example, the user of the second mobile device 108 logs into a secure payment transfer application service installed on the second mobile device 108 where the request is generated. The user may log into the payment transfer application service by entering username and/or user ID of a service account on the payment transfer application installed on the second mobile device 108. When the user enters the login details into the service account, the request for authorizing the second mobile device 108 to become the trusted device for access to the payment transfer application service may be generated by the second mobile device 108 and then transmitted to the PPS server 114.

Upon the receipt of the authorization request by the PPS server 114, the PPS server 114 may implement a series of security protocols in order to verify that a service account of the payment transfer application being accessed by the user on the second mobile device 108 belongs to the user. For instance, in a first layer of security protocol implemented by the PPS server 114, the PPS server 114 may generate a security code that may be transmitted to a phone number of the second mobile device 108. The PPS server 114 may request a user of the second mobile device 108 to enter the code on a user interface of the payment transfer application installed on the second mobile device 108.

In some embodiments, the PPS server 114 may receive computer readable instructions that are used to render the code in a format that is readable by the second mobile device 108. In one example, the code may include a secret token, which may be for example a globally unique identifier (GUID), such as for example but not limited to a unique string of characters including, but not limited to letters or numbers or both. In another example, the code may also include one or more Uniform Resource Locators (URLs). The URL may be used to designate an address from which the second mobile device 108 may obtain instructions and/or information for use. The URL may also designate an address of the PPS server 114 to which the second mobile device 108 may send a set up message. In some embodiments, the code may be associated with an expiry time. The expiry time may be included in the code. In some embodiments, the expiry time may be recorded together with the secret token associated with the code at the PPS database 118 associated with the PPS server 114 when the code is generated.

The generated code by the PPS server 114 is then provided to a user of the second mobile device 108. The user may then enter the code into a user interface of the payment transfer application installed on the second mobile device 108. The second mobile device 108 may then transmit a set up message based on the entered code. In some embodiments, the code may include instructions and/or information for how and where to send the set up message. In other embodiments, the software on the second mobile device 108 may be hard-coded to use a specific web server, or URL, or location to send the set up message. Accordingly, in some embodiments, this technology can be used as a component of software and can be locked to a specific authentication server such as the PPS server 114 or service. In some embodiments, the setup message may be transmitted to the PPS server 114. In other embodiments, the set up message may be transmitted to the PPS system 104, and the PPS system 104 may transmit to one of the servers such as the PPS server 114. In some embodiments, the set up message may include a unique identifier (UID) of the second mobile device 108. The unique identifier may be a globally unique identifier of the second mobile device 108 and can include, for example, but is not limited to, an identifier generated based on the second mobile device 108 metadata or a unique identifier associated with the second mobile device 108 including but not limited to an International Mobile Equipment Identity (IMEI) address.

In some embodiments, where the code includes an expiry time, if the expiry time has lapsed, then the second mobile device 108 does not generate a set up message, and the process ends such that the second mobile device 108 does not become a trusted device for access to the payment transfer application service unless further action is taken such as repeating the process with a valid code. In other embodiments, the PPS server 114 may determine if the code has expired and if so, rejects it. In some such embodiments, the code may not have any expiry data or timestamp and is associated a secret code on the PPS server 114 side that can be produced at the time the code was generated. In various embodiments, the setup message may be encrypted that is sent to the PPS server 114.

On the receipt of the step up message by the PPS server 114, the PPS server 114 may then implement a second layer of security protocol in order to verify that a service account of a payment transfer application being accessed by the user on the second mobile device 108 belongs to the user. The second layer of security protocol implemented by the PPS server 114 corresponds to matching of contacts of the user in a phone book of the second mobile device 108 with a list of contacts associated to any previous devices of the user used for accessing the service account of the payment transfer application service. In some embodiments, there may only be one layer of security protocol implemented by the PPS server 114, in order to verify that the service account of the payment transfer application service being accessed by the user on the second mobile device 108 belongs to the user, and the only one security protocol may be matching of contacts of the user on the second mobile device 108 with a list of contacts stored in one or more previous devices of the user.

As part of the second layer of security protocol executed by the PPS server 114, the PPS server 114 may request access from the second mobile device 108 to a list of contacts stored in a phone book of the second mobile device 108. In some embodiments, the second mobile device 108 may have had automatically transmitted the list of contacts stored in a memory of the second mobile device 108 to the PPS server 114 prior to receiving the request from the PPS server 114 and when the user log on to the payment transfer application installed on the second mobile device 108. In some embodiments, the second mobile device 108, upon receiving the request from the PPS server 114, may create hash values for each contact in the list of contacts stored in a memory of the second mobile device 108, and the hash value for each contact may then be transmitted by the second mobile device 108 to the PPS server 114 rather than the usernames of the contacts indicated by the hash values, such that the second mobile device 108 avoids the need to reveal usernames and/or identification details of the list of contacts to the PPS server 114. In some embodiments, the second mobile device 108 may create hash values for each contact in the list of contacts stored in a memory of the second mobile device 108 and store the hash values in a second local database 109 associated with the second mobile device 108, and upon receiving the request from the PPS server 114, the hash values may then be retrieved from the local database by the second mobile device 108 and transmitted to the PPS server 114.

Similar to the local database 112 of the first mobile device 102, the second local database 109 of the second mobile device 108 may store a list of contacts in contacts data and data related to transactions performed using a payment transfer application. In some embodiments, data, such as the list of contacts and/or transaction data transmitted over the suitable communication network 106 from the second mobile device 108 to the second local database 109, may be formatted and/or encrypted in accordance with various protocols, such as security and communication protocols. For example, all or a portion of the communication network 106 may be a packet-based, Internet Protocol (IP) network that communicates the data from the second mobile device 108 to the second local database 109 as TCP/IP packets. In some implementations, contacts data and/or transaction data may be formatted in accordance with a data format specification or protocol expected by the second local database 109 and/or the PPS system 104, and then the formatted data may be transmitted by the second mobile device 108 to the second local database 109.

In some embodiments, the second local database 109 may be hosted on any mobile device (such as the second mobile device 108). The second local database 109 is capable of storing the transaction data and the list of contacts in a plaintext format and/or encrypted version. The second local database 109 may be in communication with a processor, where the processor is capable of executing the various commands of the database management system. In some embodiments, the second local database 109 may be part of the second mobile device 108; and, in some embodiments, the second local database 109 may be a separate device that is in communication with the second mobile device 108.

The second local database 109 and/or the PPS database 118 may be in communication to each other via the network 106, and may include a non-transitory machine-readable storage media capable of receiving, storing, updating, and/or querying contacts and transaction records stored in the second local database 109. The second local database 109 and/or the PPS database 118 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the PPS server 114 and/or the second mobile device 108.

In some embodiments, the memory of the second local database 109 may be a non-volatile storage device for storing data and instructions to be used by a processor of the second mobile device 108 and/or the PPS server 114. The memory may be implemented with a magnetic disk drive, an optical disk drive, a solid state device, or an attachment to a network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory.

In some embodiments, the memory of the second local database 109 may be a temporary memory, such that a primary purpose of the memory is not long-term storage. The memory described as a volatile memory, meaning that the memory do not maintain stored contents when the second mobile device 108 is turned off. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

The PPS server 114 subsequently compares the hash values for each respective contact record of the user stored on the second mobile device 108 with the hash values for each respective contact record of the user obtained from a mobile device used by the user prior to using the second mobile device 108, for example, the first mobile device 102. In response to determining that hash values of contacts received from the second mobile device 108 satisfy a threshold amount of matches or exceed a contact similarity score based on a comparison between hash values obtained from the second mobile device 108 and the hash values obtained from the first mobile device 102, the PPS server 114 may grant the user of the second mobile device 108 access to the payment transfer application installed on the second mobile device 108.

Based on the comparison results of the hash values, where the PPS server 114 determines that the hash values of contacts received from the second mobile device 108 does not satisfy a threshold amount of matches based on a comparison between hash values obtained from the second mobile device 108 and the hash values obtained from the first mobile device 102, the PPS server 114 may then generate additional security layer of questions for the user of the second mobile device 108 and transmit the additional question to the second mobile device 108. For example, when the PPS server 114 determines that the hash values of contacts received from the second mobile device 108 does not satisfy a threshold amount of matches based on a comparison between hash values obtained from the second mobile device 108 and the hash values obtained from the first mobile device 102, the PPS server 114 may generate a list of one or more questions for the user, including but not limited to, details related to bank account, social security number, mother's name, father's name, date of birth, year of opening the account, or last three transactions performed by the user using the payment transaction application. The list of one or more questions generated by the PPS server 114 may then be transmitted by the PPS server 114 to the second mobile device 108. The user's answers to the questions may be transmitted by the second mobile device 108 to the PPS server 114. After receiving the answers provided by the user of the second mobile device 108 for the set of questions, the PPS server 114 will then match the answers provided by the user for the set of questions with answers to same set of questions previously provided by the user at the time of initial registration of service account of a payment transfer application, which are stored in the PPS database 118. Upon determining by the PPS server 114 that the answers provided by the user for the set of questions matches with the previously provided and verified answers by the user for the same set of questions, the PPS server 114 may authorize access for the user to the payment transfer application service on the second mobile device 108, in addition to the authorization of the second mobile device 108 to become the trusted device for access to the payment transfer application service for any future transactions.

In some embodiments, upon the PPS server 114 authorizing the access to the user of the payment transfer application service on the second mobile device 108, the user may want to request a payment transfer to another user (recipient) using second mobile device 108. The second mobile device 108 of the user and a device being used by the recipient may or may not be in direct communication with each other in order to transmit a payment request, payload, token, or other financial information associated with the payment request.

A processor of the second mobile device 108 and/or the PPS server 114 may generate instructions for the second mobile device 108 to populate a user interface and generate a payment request. The processor of the second mobile device 108 and/or the PPS server 114 may utilize the network 106 to communicate the payment request and other relevant information to device of the recipient via a message or an e-mail.

In some embodiments, when the user generates a request to transfer a payment to the recipient using the payment transfer application of the second mobile device 108, the PPS server 114 initiates a process for verifying recipient and the payment destination accounts of the recipient for outgoing transactions from the payment transfer application. Upon generation of the transfer request by the second mobile device 108, the second mobile device 108 may automatically transmit hash values for each respective contact stored on the second mobile device 108 to the PPS server 114 along with the transfer request. Upon the receipt of the transfer request by the PPS server 114 from the second mobile device 108, the PPS server 114 may generate a query and transmit the query to the second mobile device 108 to obtain the hash values for each respective contact stored on the second mobile device 108. Upon receiving the query from the PPS server 114, the second mobile device 108 may transmit the hash value for each respective contact stored on the second mobile device 108 or a local database associated with the second mobile device 108 to the PPS server 114. Upon receiving the query, the second mobile device 108 may first generate the hash value for each respective contact stored on the second mobile device 108 or a local database associated with the second mobile device 108 and then transmit the hash value for each respective contact to the PPS server 114. In an alternative embodiment, the second mobile device 108 may directly transmit a list of contacts to the PPS server 114 along with the transfer request, and the PPS server 114 may create a hash value for each respective contact for the list of contacts stored on the second mobile device 108. The PPS server 114 and/or the second mobile device 108 may generate hash values for contacts using a same set of rules and/or hash algorithm stored in the PPS database 118.

Upon receiving the hash values corresponding to each respective contact stored in the second mobile device 108 or upon generating the hash values for each of the contact details received from the second mobile device 108, the PPS server 114 stores the hash values of the plurality of contact records received from the second mobile device 108 in the PPS database 118. The plurality of hash values may be associated with a user record of the user of the second mobile device 108 stored in the PPS database 118. The user record of the user in the PPS database 118 may contain a history of one or more payment requests of the user indicating a respective recipient hash value associated with each respective payment request in the history of payment requests.

The PPS server 114 may receive a payment transfer request from the second mobile device 108 containing a recipient hash value for the payment request. Based on the recipient hash value in the payment request, the PPS server 114 may query a plurality of hash values corresponding to a plurality of contacts obtained from the second mobile device 108 and hash values of recipients in the history of payment requests stored in the user record in the PPS database 118. When the PPS server 114 determines that the recipient hash value in the payment request is stored in the hash values of recipients in the history of payment requests of the user, the PPS server 114 approves the payment transfer request of the user. When the PPS server 114 determines that the recipient hash value in the payment request is not stored in the plurality of hash values corresponding to a plurality of contacts obtained from the second mobile device 108 and is also not stored in the hash values of recipients in the history of payment requests, the PPS server 114 may generate and transmit a confirmation request to the second mobile device 108 of the user to confirm the recipient.

In some embodiments, the confirmation request generated by the PPS server 114 relates to an identity of the recipient, and the request may include details of the recipient including, but not limited to, name of the recipient, picture of the recipient, and/or bank account details of the recipient. The PPS server 114 may obtain the details about the recipient, such as the picture of the recipient, from an external database, by searching for social networking profiles of the recipient using input data provided by user related to the details of the recipient within the payment transfer request. Upon receiving the confirmation request from the PPS server 114, the user may input a response back to the PPS server 114. Upon receiving, by the PPS server 114, a positive confirmation from the user in response to the confirmation request, the PPS server 114 may then approve the payment transfer process request of the user, and the payment is transferred to the recipient mentioned on a payment transfer request.

In some embodiments, when the PPS server 114 determines that recipient contact is not mentioned in user list of contacts obtained from the second mobile device 108, the PPS server 114 may employ contacts of contacts search. While employing the contacts of contacts search, the PPS server 114 may examine contact lists of some or all of a user's contacts in order to identify contacts of the user's contacts that match with the recipient. In some embodiments, some or all of user's contacts may be registered with the PPS system 104 and therefore there may be a hash value stored of them in the PPS database 118 of the PPS system 104. When the PPS server 114 determines that the recipient hash value in the payment request matches with a hash value of any of the user's contacts of contacts, the PPS server 114 may approve the payment transfer request of the user. In some implementations, the PPS server 114 may determine a similarity score based on weighted values assigned to the hashed values, indicating the likelihood that a contact or set of contacts received from a recipient-user device are matched to a contact or set of contacts received from the sending-user device.

In some embodiments, when the PPS server 114 determines that the recipient hash value in the payment request matches a hash value of any of the contacts associated with the contacts of the user (a contact of one of the user's contacts), the PPS server 114 may determine a status of the contact whose hash value matches with the recipient. The status of the matching contact may be stored in the PPS database 118, if the matching contact is registered with the PPS system 104. The status details may include a profile of the matching contact. The profile may include information related to transaction records of the person and/or any feedback of the person provided by other members of the PPS system 104 as well external law enforcement agencies. Upon determining that the contact whose hash value matches with the recipient has been flagged by an administrator of the PPS system 104, the PPS server 114 may not approve the payment transfer request of the user to the recipient, and instead the PPS server 114 may generate and transmit a confirmation request to the second mobile device 108 of the user to confirm the recipient.

Figure 2:
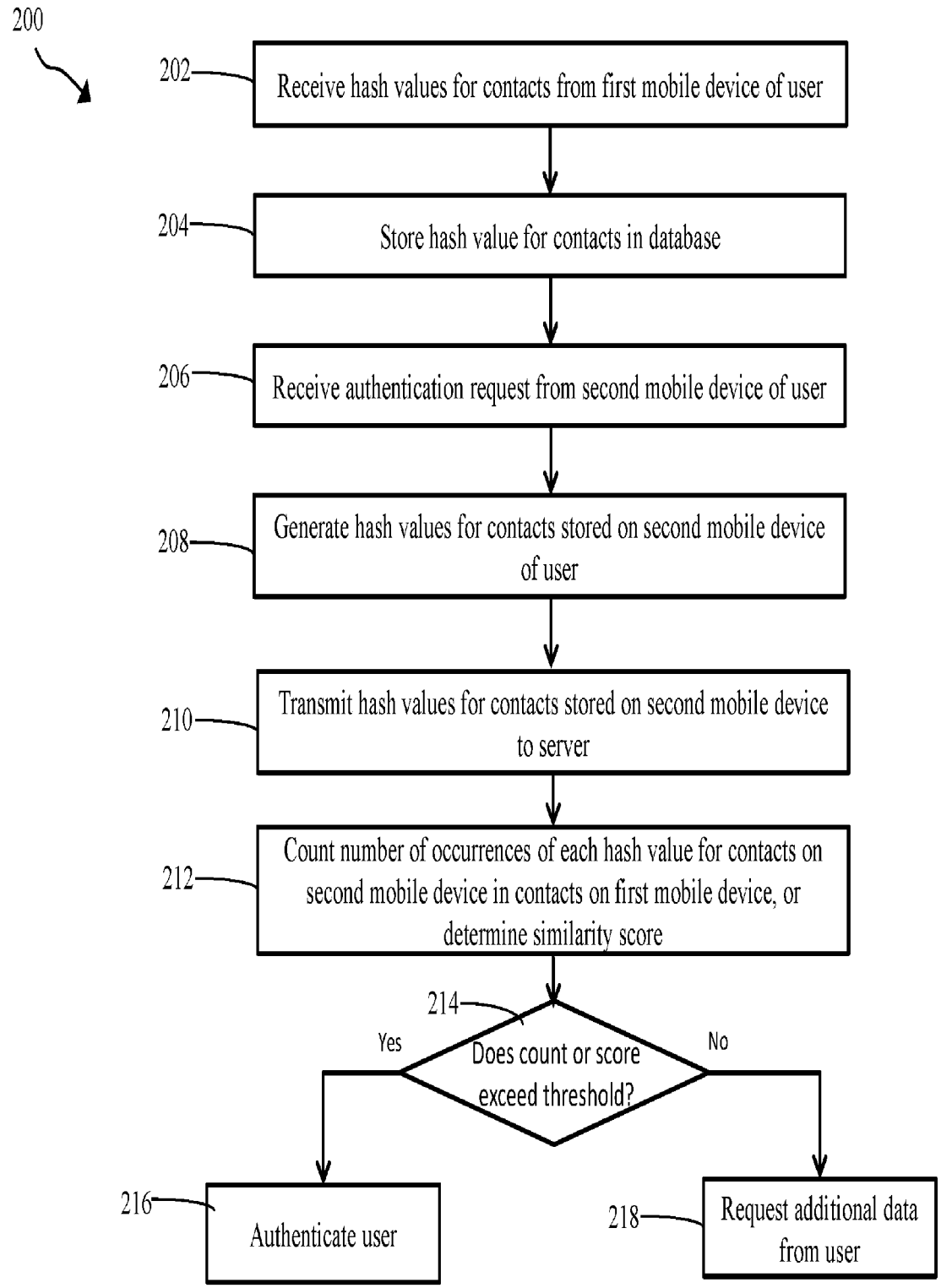
FIG. 2 illustrates an example of a process for authenticating a user accessing payment transfer application on a mobile device, according to an embodiment.

FIG. 2 illustrates a flowchart process 200 for authenticating a user accessing payment transfer application on a mobile device in accordance with an embodiment. The steps of flowchart process 200 may be implemented using one or more modules of a PPS system such as a PPS server. FIG. 2 does not imply any limitations with regard to the environments or embodiments that may be implemented. Modifications to the depicted environment or embodiment shown in FIG. 2 may be made.

At step 202, a PPS server may receive hash values for each contact in a list of contacts on a first mobile device of a user. In some embodiments, initially, a user interested in using a payment transfer application of a PPS system might not have any relationship with the PPS system, so the user will register with the PPS system. The user may be asked by the PPS server to input a username and other identifying information, such as name, address, social security number, date of birth, and current and prior addresses for registering with the PPS system.

Upon registration with the PPS system, a user may execute a payment transfer application on the first mobile device. In some embodiments, upon execution of the payment transfer application on the first mobile device, the first mobile device may receive a request from the PPS server to create a hash value for each contact in the list of contacts stored on the first mobile device or a local database associated to the first mobile device. The first mobile device may then create the hash value for each contact stored on the first mobile device or the local database associated to the first mobile device. Upon creation of the hash value for each contact, the first mobile device may then transmit the hash value for each respective contact to the server and/or store the hash value for each respective contact in the list of contacts in the local database associated with the first mobile device along with the list of contacts.

In some embodiments, upon execution of the payment transfer application, the first mobile device may automatically create a hash value for each contact in the list of contacts, stored on the first mobile device or a local database associated to the first mobile device. The first mobile device may then automatically transmit the hash value for each respective contact in the list of contacts to the server and/or store the hash value for each respective contact in the list of contacts in the local database associated to the first mobile device along with the list of contacts.

Upon the transfer of the hash value for each contact in the list of contacts from the first mobile device to the PPS server, the first mobile device may receive instructions from the PPS server. The instructions from the PPS server may specify one or more rules based on which the first mobile device may periodically generate the hash value for contacts after pre-defined intervals of time. For example, the first mobile device may generate a hash value for an updated contact list on the first mobile device when there is new addition of contacts in the list of contacts on the first mobile device. The hash values generated for the updated contact list on the first mobile device may then be transmitted to the server and/or stored in the local database associated to the first mobile device, along with list of updated contacts after the pre-defined intervals of time. Upon the transfer of the hash value for each contact in the list of contacts from the first mobile device to the PPS server, the first mobile device may receive instructions to generate and transmit the hash value for each new contact added by the user into a list of contacts as soon as the new contact is added in the first mobile device. The hash value generated for each new contact by the first mobile device is transmitted by the first mobile device to the server and/or stored in the local database associated to the first mobile device along with details of the new contact.

At step 204, upon receiving the hash value for contacts on the first mobile device, the PPS server may store the hash values in the PPS database of the PPS system. In some embodiments, the PPS database may be a non-transitory machine-readable storage media capable of receiving, storing, and updating the first mobile device contact records and their corresponding hash values. The PPS database may include a logical construct of data files that are stored in non-transitory machine-readable storage media, such as a hard disk or memory. The logical construct of data files may be controlled by software modules of a database program (for example, SQL), and a related database management system (DBMS) that executes the code modules (for example, SQL scripts) for various data queries and other management functions received from the PPS server and/or the first mobile device.

At step 206, the PPS server may receive an authentication request from a second mobile device of the user. When the user logs into an account of a payment transfer application from a new mobile device (for example, the second mobile device), the PPS server may receive an authentication request from the second mobile device.

In some embodiments, the user may login into the account of the payment transfer application on the second mobile device by entering a login input that is transmitted to the PPS server (e.g., via the network). The login input may include at least one of symbolic, alphanumeric, graphical, audio, video, or any other type of input data. The login input may also include user information, such as name, age, gender, address, credit score information, or any other relevant information, such as personal information. The login input entered by the user may be stored in a local database of the second mobile device and/or transmitted by the second mobile device to the PPS server.

Upon the receipt of the authorization request by the PPS server, the PPS server may execute a series of security protocols generated by the PPS server to verify that the service account of the payment transfer application being accessed by the user on the second mobile device belongs to the user. For instance, in a first layer of security protocol executed by the PPS server, the PPS server may generate a security code that may be transmitted to a phone number of the second mobile device, and a user of the second mobile device may be requested to enter the code on a user interface of the payment transfer application. The user may then enter the code into the user interface of the payment transfer application on the second mobile device, and upon the receipt of the correct code by the PPS server, the PPS server may then execute a second layer of security protocol, in which the PPS server may generate and transmit a request to the second mobile device to forward a list of contacts and/or hash values for the list of contacts stored on the second mobile device or in a local database associated with the second mobile device.

At step 208, upon receiving the request from the PPS server, the second mobile device may generate hash values for contacts stored on the second mobile device. In some embodiments, the second mobile device may generate hash values for each contact on the second mobile device in accordance to a hash function. The hash function may be a function that take input contact records of any length as their inputs and generate hash value of specific length. The hash function may be configured with block ciphers that take contact records as their inputs. The hash function may perform a block encryption of the contacts, and finally output the result as a hash value. In one example, the PPS server may execute a one-way hashing algorithm to convert the input contact records into the hash values where the length of the resulting hash is chosen such that one hash value indicates one contact.

At step 208, upon the generation of the hash values for each contact on the second mobile device, the second mobile device may then transmit the hash values for each contact stored on the second mobile device to the PPS server. The PPS server may then transmit the hash values for each contact stored on the second mobile device of the user to a user record file stored in a PPS database of the PPS server. The user record file may contain information related to the user, such as username, account number, social security number, address, a list of other authorized devices of the user, and hash value of contacts stored in other authorized devices of the user.

At step 212, upon receiving the hash values for each contact on the second mobile device, the PPS server may initiate a query to the PPS database to retrieve the user record in order to identify previously stored hash value of contacts of other authorized devices of the user. Then the PPS server may compute a similarity contact score by comparing the hash values associated with the second mobile device with those of the second mobile device. In one example, the PPS server may derive the similarity contact score by counting a number of occurrences of each hash value for each contact obtained from the second mobile device of the user that appear in the previously stored hash value of contacts of other authorized devices of the user, such as previously stored hash values of contacts of the first mobile device of the user. In other words, the PPS server may compare the hash values for each respective contact record of the user stored on the second mobile device with the hash values for each respective contact record of the user obtained from the first mobile device of the user.

It should be appreciated that the PPS server may rely not just on a count of the number of occurrence of each hash value, but could be based on weighted factors, in addition or as an alternative to the count of hash values. For example, the PPS server may determine a contact score based upon the popularity of certain contacts or often-used contacts, where such contacts are weighted more heavily than other contacts; this weighting is particularly useful in the event that a user mobile device does not copy every contact to the second device, and thus there could be gaps in the total data available for comparison.

At step 214, the PPS server will then determine whether the similarity contact score exceeds a threshold value. For example, the PPS server may determine whether the count of a number of occurrences of each hash value for contacts on the second mobile device when compared with the hash values of contacts of the first mobile device of the user exceeds a threshold number of matches. In some embodiments, the threshold may include a value, a flag, or a variable input or set via the PPS server. The PPS server may receive or set a threshold number and stores the threshold number in the PPS database. Again, it should be appreciated that the PPS server may determine the contact score based upon weighted contacts, which are weighted according to the respective popularity of certain contacts that are often-used.

The PPS server compares the hash value of contacts stored on the second mobile device of the user and the hash value of contacts on the first mobile device of the user. When the comparison satisfies a threshold amount of matches, the PPS server may authenticate a user of the second mobile device to access a payment transfer application on the second mobile device at step 216.

When the PPS server determines that the hash values of contacts received from the second mobile device does not satisfy a threshold amount of matches, the PPS server may then generate additional questions for a user of the second mobile device and transmit the additional question to the second mobile device, at step 218. For example, when the PPS server may generate a list of one or more questions for the user, including but not limited to, details related to bank account, social security number, mother's name, father's name, date of birth, year of opening the service account of a payment transaction application, and last three transactions performed by the user using the payment transaction application. The list of one or more questions generated by the PPS server may be transmitted by the PPS server to the second mobile device of the user, and upon obtaining the answers provided by the user for the set of questions, the PPS server will then match the answers provided by the user for the list of one or more questions to answers previously provided by the user at the time of initial registration of an account of a payment transaction application that are stored in the PPS database. Upon determining, by the PPS server, that the answers provided by the user for the set of questions matches with the previously provided and verified answers by the user for the same set of questions, the PPS server authenticates the user to access the payment transfer application service on the second mobile device.

Figure 3:
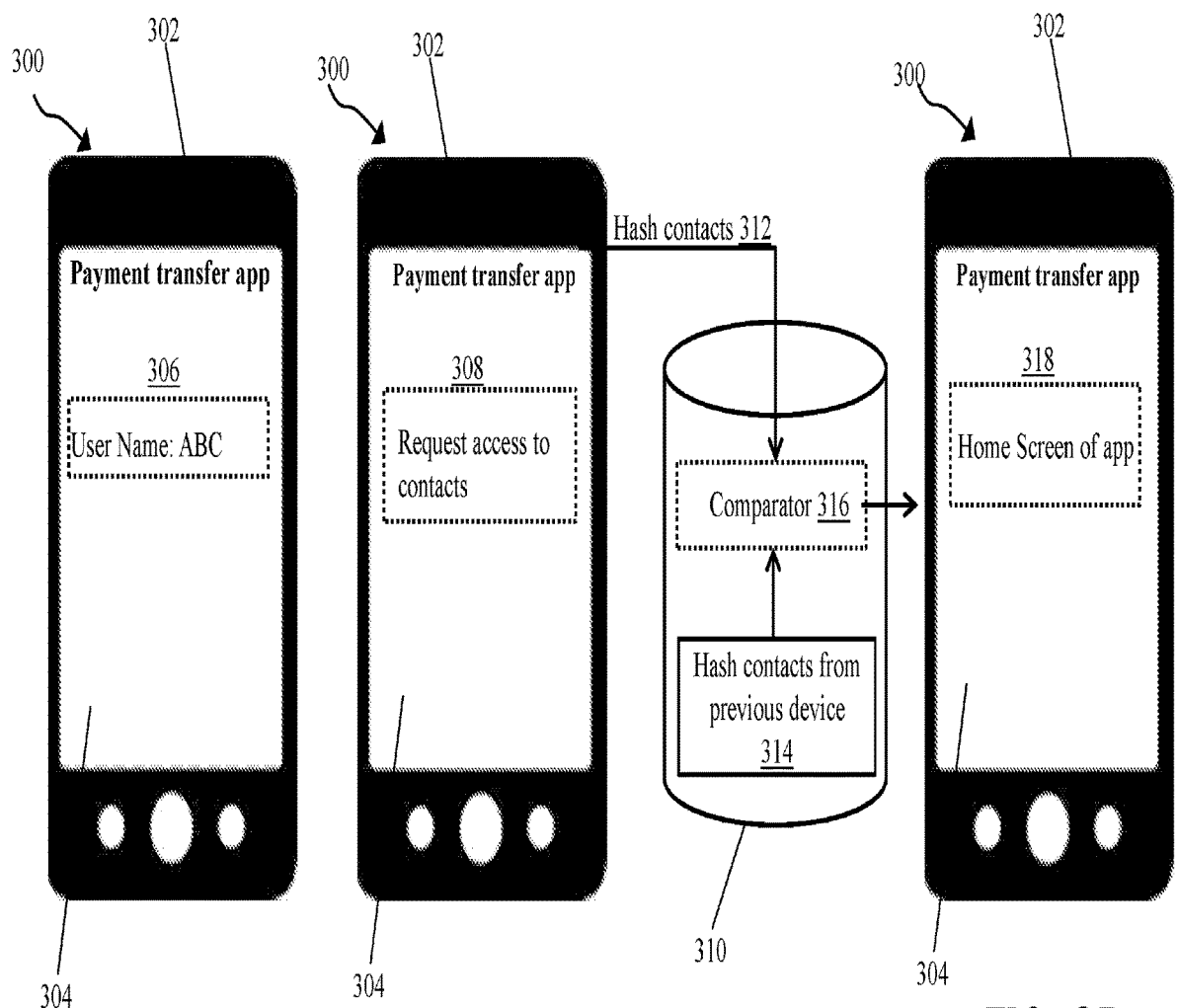
FIG. 3A illustrates a graphical user interface (GUI) for presenting a login process when a user is accessing payment transfer application on a mobile device, according to an embodiment.
FIG. 3B illustrates a graphical user interface for presenting a login process when a user is accessing payment transfer application on a mobile device, according to an embodiment.
FIG. 3C illustrates a database of a payment processing system (PPS) in communication with a mobile device, according to an embodiment.
FIG. 3D illustrates a graphical user interface for presenting a login process when a user is accessing payment transfer application on a mobile device, according to an embodiment.

FIGS. 3A, 3B, and 3D illustrate a graphical user interface (GUI) 304 for presenting a login process of a user accessing payment transfer application on a mobile device 300, according to an embodiment.

The mobile device 300 has a display 302. In some embodiments, the display 302 of the mobile device 300 may include a cathode ray tube (CRT) display, liquid crystal display (LCD), plasma, or light emitting diode (LED) display. In some examples, the display 302 may provide some or all of the functionality of a user interface 304 of the mobile device 300. For instance, the display 302 may be a touch-sensitive and/or presence-sensitive display that can display a graphical user interface (GUI) 304 and detect input from a user in the form of user input gestures. A graphics subsystem may receive textual and graphical information and process the information for output to the display 302.

The display 302 includes a user interface 304 that allows a user of the mobile device 300 to interact with the mobile device 300. The examples of the user interface 304 include, but are not limited to, a keypad embedded on the mobile device 300, a keyboard, a mouse, a roller ball, buttons, stylus, or other devices that allow the user to interact with the mobile device 300. In some examples, the mobile device 300 does not include the user interface 304, and the user interacts with the mobile device 300 with the display 302 (e.g., by providing various user gestures). In some examples, the user interacts with the mobile device 300 with the user interface 304 and the display 302.

The user interface 304 may further contain multiple portions where each portion may be used for a specific purpose, such as sending and receiving messages via a communication service application, generating a message and interacting with a third party application, and loading an application, such as the PSS API. In one example, when the user of the mobile device 300 requests access a payment transfer application installed on the mobile device 300, the user may be prompted to enter login details 306 such as username, as displayed on the user interface 304 of the payment transfer application, depicted in FIG. 3A. Upon the entry of username, the PPS server may generate a message 308 indicating request to access to contacts, as displayed on the user interface 304 of the payment transfer application, depicted in FIG. 3B.

The user of the mobile device 300 will have an option on one of the portions of the user interface 304 to accept or deny the request message. Upon accepting the request message by the user of the mobile device 300, a hash value of contacts 312 are transmitted from the mobile device 300 to a database 310 of the PPS system, as depicted in FIG. 3C. A processor of the PPS system then compares, using a comparator 316, the hash value received from the mobile device 300 of the user with previously stored hash value of contacts 314 obtained from previous devices of the user.

Upon determining that the hash values of contacts received from the mobile device 300 satisfy a threshold amount of matches when compared with the hash values of contacts obtained from the previous devices of the user that are stored in the database 310, the PPS system processor authenticates the user of the mobile device 300 to access to the payment transfer application, and a home screen page 318 of the payment transfer application is launched on the display 302 of the mobile device 300, as depicted in FIG. 3D.

Figure 4:
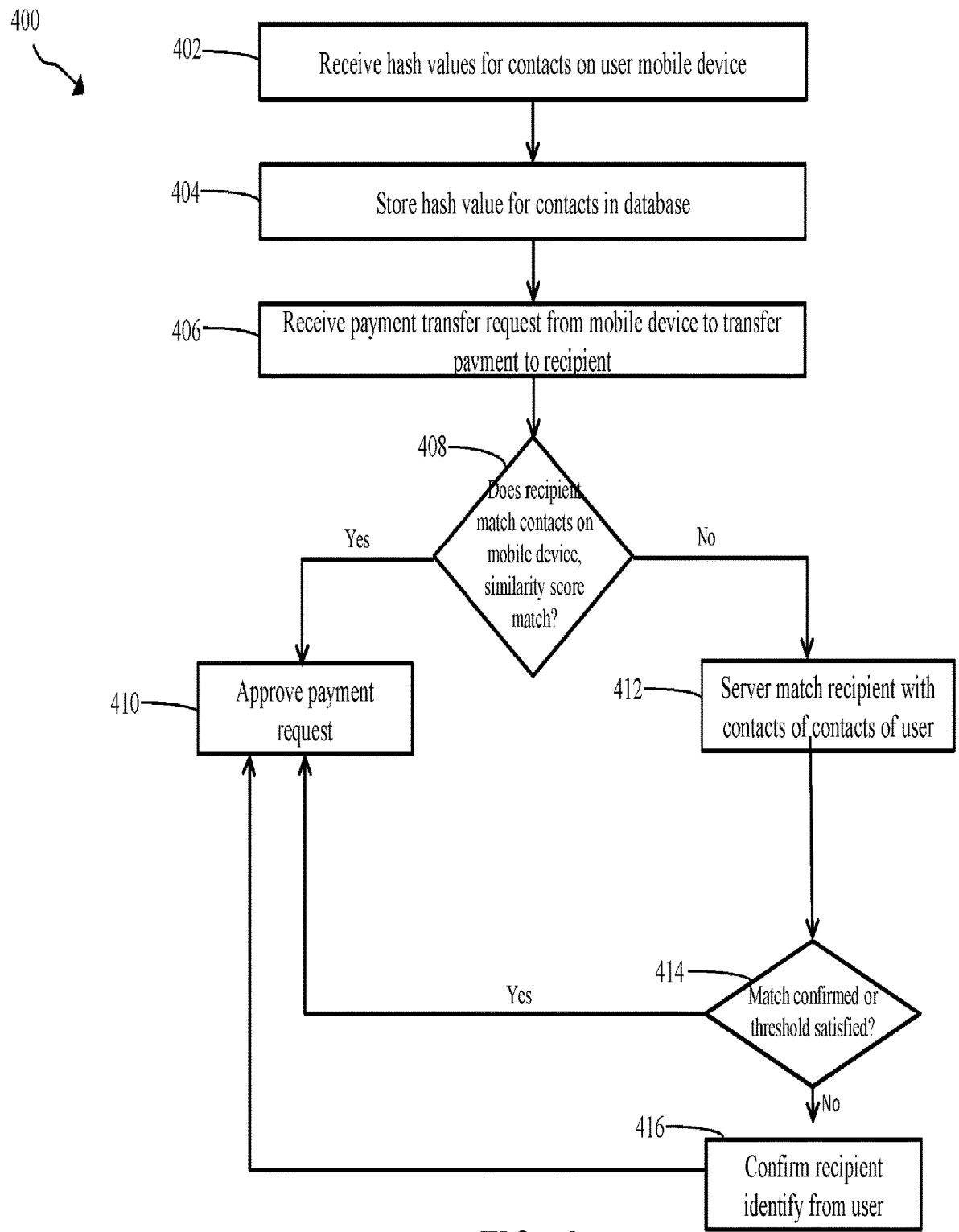
FIG. 4 illustrates an example of a process for processing mobile payment requests, according to an embodiment.

FIG. 4 illustrates an example of a process 400 for generating and processing mobile payment requests, according to an embodiment. The steps of process 400 may be implemented using one or more modules of the PPS such as the PPS server. FIG. 4 does not imply any limitations with regard to the environments or embodiments that may be implemented. Modifications to the depicted environment or embodiment shown in FIG. 4 may be made.

At step 402, a PPS server may receive hash values for each contact in a list of contacts on a mobile device of a user. In some embodiments, a user interested in using a payment transfer application of a PPS system might not have any relationship with the PPS system, so the user will be registering with the PPS system for the first time. The user may be asked by the PPS server to input a username and other identifying information, such as name, address, social security number, date of birth, and current and prior addresses for registering with the PPS system.

Upon registration with the PPS system, a user may execute a payment transfer application on the mobile device. In some embodiments, upon execution of the payment transfer application on the mobile device, the mobile device may receive a request from the PPS server to create a hash value for each contact in the list of contacts stored on the mobile device or a local database associated to the mobile device. The mobile device may then create the hash value for each contact stored on the mobile device or the local database associated to the first mobile device. Upon creation of the hash value for each contact of the list of contacts, the mobile device may then transmit the hash value for each respective contact in the list of contacts to the server and/or store the hash value for each respective contact in the list of contacts in the local database associated to the mobile device along with the list of contacts.

In some embodiments, upon execution of the payment transfer application, the mobile device may automatically create a hash value for each contact in the list of contacts stored on the mobile device or a local database associated to the mobile device. The mobile device may then automatically transmit the hash value for each respective contact in the list of contacts to the server and/or store the hash value for each respective contact in the list of contacts in the local database associated to the mobile device along with the list of contacts.

Upon the transfer of the hash value for each contact in the list of contacts from the mobile device to the PPS server, the PPS server may transmit instructions to the mobile device. The instructions from the PPS server may specify one or more rules based on which the mobile device may periodically generate the hash value for contacts after pre-defined intervals of time. For example, is the mobile device may generate a new hash value for an updated contact list on the mobile device when there is a new addition of contacts in the list of contacts on the mobile device. The hash values generated for the updated contact list on the mobile device may then be transmitted to the PPS server and/or stored in the local database associated to the mobile device, along with list of updated contacts after the pre-defined intervals of time. In some embodiments, the mobile device may receive instructions, upon the transfer of the hash value for each contact in the list of contacts from the mobile device to the PPS server, based on which the mobile device may have to generate and transmit the hash value for each new contact added by the user into a list of contacts as soon as the new contact is added in the mobile device. The mobile device transmits the hash value generated for each new contact to the server and/or stored in the local database associated to the mobile device along with details of the new contact.

At step 404, upon receiving the hash value for contacts on the mobile device, the PPS server may store the hash values in the PPS database of the PPS system. In some embodiments, the PPS database maybe a non-transitory machine-readable storage media capable of receiving, storing, and updating the mobile device contact records and their corresponding hash values. The PPS database may include a logical construct of data files that are stored in non-transitory machine-readable storage media, such as a hard disk or memory. The logical construct of data files may be controlled by software modules of a database program (for example, SQL), and a related database management system (DBMS) that executes the code modules (for example, SQL scripts) for various data queries and other management functions received from the PPS server and/or the mobile device.

At step 406, the PPS server may receive a payment transfer request from the mobile device. The PPS server may receive the payment request from the mobile device by a communication application for initiating a payment transfer. The payment transfer request may include details related to an amount of money to be paid and identification of the recipient. In some embodiments, the payment transfer request may not include any identification of who will receive the payment (i.e., the recipient). The payment transfer request may be received by the PPS server through the communication application installed on the user's mobile device. In some embodiments, the user's mobile device communication application may be linked, directly or indirectly, to the PPS server and notify the PPS server of any payment requests originated from the user's mobile device.

In some embodiments, the PPS server may receive the payment transfer request through an electronic input source when the user interacts with an electronic input source to request a payment to be made. Non-limiting examples of an input source may be spoken words, e.g., various speech recognition software, various third-party applications native to user's mobile device, e.g., third-party instant messaging application or a third-party application from user's cell phone or other portable devices that support the same or similar operating systems, or inputting a corpus electronically from a computer implemented source such as another electronic device.

In some embodiments, the user may directly enter payment transfer request information into a mobile application native to user's mobile device and in direct communication with the PPS server or designated to communicate with the PPS server. For example, the PPS server may have a designated payment transfer request (for example, the PPS API) for the user and payment transfer request may be generated through the application.

At step 408, upon receiving the payment transfer request from the mobile device, the PPS server may initiate a comparison of the details of the recipient with information stored in a local database and/or a PPS database corresponding to a user profile. For instance, the mobile device may match the details of the recipient provided by the mobile device with the list of contacts or the hash values associated with the list of contacts stored in the mobile device and/or the PPS database under the user profile. The details of the recipient provided by the user of the mobile device in the payment transfer request may include username of the recipient and/or hash value of the recipient contact details. The mobile device will then match the hash value of the recipient contact details, with the list of hash values associated with the list of contacts stored in a mobile database and/or obtained from a PPS database of the PPS system.

In some embodiments, the mobile device may automatically identify a payment request to the recipient using information from a financial account associated with the user and stored in PPS database under the user profile and/or a local database associated to the mobile device of the user. For instance, if the user pays a same amount of money on substantially the same day each month or after a recurring event to the recipient, then the mobile device may identify the payment request as a recurring payment request to the recipient based on prior history of payments made by the user stored in the PPS database under the user profile and/or a local database associated to the mobile device of the user. In one example, the recurring payment is $1000 to pay for rent and occurs around the 5th day of every month. After a predetermined number of times for that payment, the mobile device and/or the PPS server may record the recurring payment in the local database associated to the mobile device of the user and/or the PPS database and expect a similar payment request to be generated for the recipient every month around the same time.

At step 410, upon determining that the recipient matches one of the contacts in the list of contacts stored in the database of the mobile device or if the recipient matches to be one the recipients in a payment history record of the user stored in the mobile database, the mobile device may send a notification to the PPS server that the recipient has matched one of the contacts or is in list of recipients of the prior payment history of the user. Upon receiving the notification from the mobile device, the PPS server may then approve the payment request of the user.

At step 412, upon determining that the recipient does not match one of the contacts in the list of contacts stored in the database of the mobile device or if the recipient does not match to be one of the recipients in a payment history record of the user stored in the mobile database, the mobile device may send a notification to the PPS server that the recipient has not matched any contacts of the mobile device, and/or is not in list of recipients in the prior payment history of the user. Upon receiving the notification, the PPS server matches the recipient with contacts of contacts of the user. For instance, the PPS server may examine contact lists of some or all of user's contacts obtained from the mobile device in order to identify contacts of the user's contacts that match with the recipient contact details or corresponding hash value. In some embodiments, some or all of the user's contacts may also be registered with the PPS system, and therefore there may be a hash value associated to some or all of the user's contact stored in the PPS database of the PPS system.

The PPS server may compute a similarity score among contact entries using any number of entries in a contact list. In some implementations, the PPS server may determine a similarity score based upon the contact entries received from two different mobile devices. In some implementations, the similarity score may be based upon contact list entries of a sending-user device and a recipient-user device, such that the PPS server reviews each user's contact list. In such implementations, the PPS server may compute a similarity score based on a full or subset of hash values for each user, such that the PPS server determines a similarity score indicating whether the sending-user is sending the payment to the correct, intended recipient. Here, the similarity score may be based on a predetermined number of matches, or summation of weighted values of frequently employed contacts from both contact lists, between the two contact lists.

In some implementations, the PPS server may determine the similarity score based upon the hash values of the recipient-user's contacts, at a predetermined degree of separation. For example, the PPS server may determine a similarity score between hash values for contacts from the sending-user device and hash values for contacts from the recipient-user device; the PPS server may then determine a supplemental similarity score (supplementing the initial similarity score) based upon hash values for contacts of the recipient-user device and a pre-stored hash values from the contacts list of one or more contacts of the recipient-user device. The PPS server may review the hash values for any number of contacts in the recipient-user device, at any iterative degree of separation.

At step 414, upon determining that the recipient (or recipient hash value) matches any contact of the contacts (or their corresponding hash values) of the user, the PPS server may approve the payment transfer request of the user to the recipient. As previously mentioned, in some implementations, rather determine whether a count of matches satisfies a match threshold, the PPS server may determine a similarity score satisfies a score threshold.

At step 416, upon determining that the recipient does not match any contact of the contacts of the user, the server may transmit a confirmation request to user to confirm identity of the recipient. When the user confirms the identity of the recipient, the PPS server may then approve the payment transfer request of the user. In some embodiments, the confirmation request related to identify of the recipient may include details of the recipient including but not limited to name of the recipient, picture of the recipient, and/or bank account details of the recipient. The PPS server may obtain the details about the recipient, such as the picture of the recipient, from an external database, by searching for social networking profiles of the recipient, using input data provided by the recipient by the user. Upon receiving, by the PPS server, a positive confirmation from the user in response to the confirmation request, the PPS server may then approve the payment transfer process request of the user, and the payment is then transferred to a recipient mentioned on the payment transfer request.

Figure 5A:
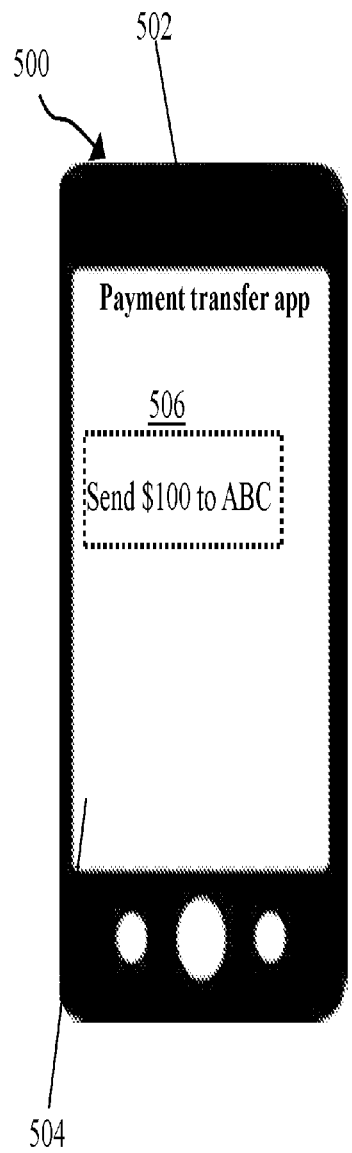
FIG. 5A illustrates a graphical user interface for presenting a mobile payment request, according to an embodiment.
Figure 5B:
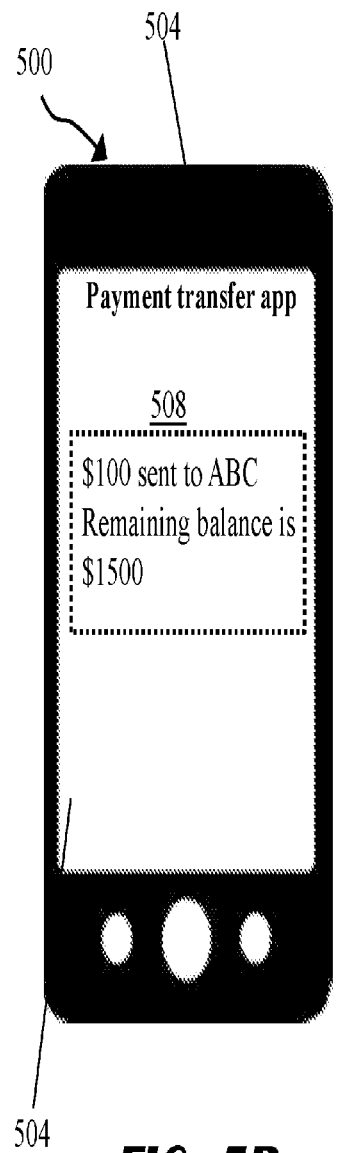
FIG. 5B illustrates a graphical user interface for presenting a mobile payment request, according to an embodiment.

FIGS. 5A-5B illustrate a graphical user interface (GUI) 504 for presenting a mobile payment request from a mobile device 500, according to an embodiment. The mobile device 500 has a display 502. In some embodiments, the display 502 of the mobile device 500 may include a cathode ray tube (CRT) display, liquid crystal display (LCD), plasma, or light emitting diode (LED) display. In some examples, the display 502 may provide some or all of the functionality of a user interface 504 of the mobile device 500. For instance, the display 502 may be a touch-sensitive and/or presence-sensitive display that can display a graphical user interface (GUI) 504 and detect input from a user in the form of user input gestures.

The display 502 includes the user interface 504 that allows a user of the mobile device 500 to interact with the mobile device 500. The examples of the user interface 504 include, but are not limited to, a keypad embedded on the mobile device 500, a keyboard, a mouse, a roller ball, buttons, stylus, or other devices that allow the user to interact with the mobile device 500. In some examples, the mobile device 500 does not include the user interface 504, and the user interacts with the mobile device 500 with the display 502 (e.g., by providing various user gestures). In some examples, the user interacts with the mobile device 500 with the user interface 504 and the display 502.

The user interface 504 may further have multiple portions where each portion may be used for a specific purpose such as sending and receiving messages via a communication service application, generating a message and interacting with a third party application and to load an application such as the PSS API. In one example, as displayed on the user interface 504 of the FIG. 5A, a message 506 showing a payment request for $100 to a recipient ("ABC") has been initiated by the user. The user may generate a payment request using an input unit such as a keyboard, mouse, pointer, or other input generating device to facilitate input of instructions. In one instance, the input unit may provide a portion of a user interface 504 for the mobile device 500, and may include an alphanumeric keypad for inputting alphanumeric and other key information along with a cursor control device such as a mouse, a trackpad, or stylus.

Upon generation of the payment request by the user, in some embodiments, a PPS server generates a payment authorization query to a record server, sometimes referred to as a "system of record" server. The record server communicates with a financial institute associated with the user in order to determine whether the user has sufficient funding to complete the payment request or not. Upon receiving authorization from the record server for the $100 payment, the PPS server determines whether the recipient (ABC) matches one of the contacts on the mobile device 500 of the user or not. In some embodiments, the PPS server may determine whether the recipient (ABC) matches one of the contacts on the mobile device 500 of the user or not prior to generating a payment authorization query to the record server. In this example, the PPS server determines that the recipient (ABC) matches one of the contacts of the user stored in the mobile device 500 and the payment request of the user is accepted, and therefore a message 508 is displayed as depicted in FIG. 5B indicating to the user that the money has been transmitted to the recipient.

In some other embodiments, the server, on receiving inputs from a record server based on the payment authorization query, may determine that the user does not have sufficient money to transfer, then the PPS server generates instructions for user's mobile device to display message that informs the user that the user does not have sufficient funding to complete the payment request. The PPS server may generate instructions to user mobile device to display options for the user to cure the monetary deficiency. Options are generated by the PPS server based on the user account information kept in the PPS database. For example, the user has previously registered two bank cards with the PPS. The PPS server generates instructions to user mobile device to provide the user with options to cure the funding deficiency using those bank cards.

FIGS. 6A-6C illustrate a graphical user interface (GUI) 604 for presenting a mobile payment request from a mobile device 600, according to an embodiment. The mobile device 600 has a display 602 where the display 602 includes a user interface 604 that allows a user of the mobile device 600 to interact with the mobile device 600.

In one example, as displayed on the user interface 604 of the FIG. 6A, a message 606 shows a payment request for $100 to a recipient ("XYZ") has been initiated by the user. The user may generate a payment request using an input unit such as a keyboard. Upon generation of the payment request by the user as depicted in the FIG. 6A, in some embodiments, the PPS server determines that the recipient matches one of the contacts in a list of contacts stored in a memory of the mobile device 600, or the recipient matches one of the recipients in a payment history record of the user stored in a PPS database, or the recipient matches any contact of the contacts of the user. The PPS server upon determining that the recipient does not match any contacts in the list of contacts of the mobile device 600, or with a list of recipients in a payment history record of the user stored in the PPS database, or with any contact of the contacts of the user, the PPS server may then transmit a message 608 indicating a confirmation request to user to confirm identity of the recipient, as displayed in the FIG. 6B. Upon receiving, by the PPS server, a positive confirmation from the user in response to the confirmation request message 608, the PPS server may then approve the payment transfer process request of the user, and a message 610 is displayed as depicted in FIG. 6C indicating to the user that the money has been transmitted to the recipient.

Although certain illustrative, non-limiting exemplary embodiments have been presented, various changes, substitutions, permutations, and alterations may be made without departing from the scope of the appended claims. Further, the steps of the methods described herein may be carried out in any suitable order, or simultaneously where appropriate. Thus, the scope of the disclosure should not necessarily be limited by this description.

Unless specifically stated otherwise as apparent from the following discussion, it is appreciated that throughout the description, discussions utilizing terms such as "processing," "computing," "transmitting," "receiving," "determining," "displaying," "identifying," "presenting," "establishing," or the like, may refer to the action and processes of a data processing system, or similar electronic device that manipulates and transforms data represented as physical (electronic) quantities within the system's registers and memories into other data similarly represented as physical quantities within the system's memories or registers or other such information storage, transmission or display devices. The system or portions thereof may be installed on an electronic device.

The exemplary embodiments may relate to an apparatus for performing one or more of the functions described herein. This apparatus may be specially constructed for the required purposes, or it may comprise a special purpose computer selectively activated or reconfigured by a computer program stored in the computer. Such a computer program may be stored in a machine (e.g., computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions for operations on a processor, and each coupled to a bus.

The exemplary embodiments described herein are described as software executed on at least one server, though it is understood that embodiments may be configured in other ways and retain functionality. The embodiments may be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein may be used to implement the systems and techniques according to this disclosure.

The exemplary embodiments may relate to an apparatus for performing one or more of the functions described herein. This apparatus may be specially constructed for the required purposes or be selectively activated or reconfigured by computer executable instructions stored in non-transitory computer memory medium or non-transitory computer-readable storage medium.

It is to be appreciated that the various components of the technology may be located at distant portions of a distributed network or the Internet, or within a dedicated secured, unsecured, addressed/encoded or encrypted system. Thus, it should be appreciated that the components of the system may be combined into one or more devices or co-located on a particular node of a distributed network, such as a telecommunications network. As will be appreciated from the description, and for reasons of computational efficiency, the components of the system may be arranged at any location within a distributed network without affecting the operation of the system. Moreover, the components could be embedded in a dedicated machine.

Furthermore, it should be appreciated that the various links connecting the elements may be wired or wireless links, or any combination thereof, or any other known or later developed element(s) that is capable of supplying or communicating data to and from the connected elements. The term "module" as used herein may refer to any known or later developed hardware, software, firmware, or combination thereof that is capable of performing the functionality associated with that element.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Presently preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation may be combined with one or more features of any other implementation.

What is claimed is:

1. A method comprising:
   receiving, by a payment service system (PSS) and from a payment application executing on a device of a sender, a payment request including a recipient identifier corresponding to a recipient, wherein the sender and recipient have respective financial accounts associated with the PSS, the device of the sender having encrypted contact records of the sender stored thereon and shared with the PSS;
   performing, at the device of the sender, a first authentication process to determine that there is no match for the recipient identifier in the encrypted contact records stored locally on the device of the sender;
   receiving, at the PSS and from the device of the sender, a notification of the first authentication process performed on the device of the sender;
   upon receiving the notification, performing, by the PSS, a second authentication process, wherein the second authentication process is different than the first authentication process performed on the device of the sender and the second authentication process compares encrypted contact records of the sender and encrypted contact records of the recipient to determine a similarity score between the sender and the recipient identified in the payment request, wherein the encrypted contact records of the sender and the encrypted contact records of the recipient are stored in a database communicatively coupled to the PSS; and
   authorizing, by the PSS, a payment transaction associated with the payment request based at least in part on (i) a determination that the similarity score satisfies a threshold or (ii) upon receiving an approval of the recipient from the device.

2. The method of claim 1, wherein each contact record of the encrypted contact records of the sender and the encrypted contact records of the recipient are assigned a weighted value; and
   determining the similarity score includes calculating a summation of weighted values associated with the encrypted contact records of the sender and the encrypted contact records of the recipient.

3. The method of claim 2, wherein the weighted value assigned to a contact record of the encrypted contact records of the sender and the encrypted contact records of the recipient is based at least in part on frequency of association of the contact record with the sender or the recipient.

4. The method of claim 1, wherein the similarity score is further determined based at least in part on a degree of separation between the encrypted contact records of the sender and the encrypted contact records of the recipient.

5. The method of claim 1, where the similarity score is based on contact records associated with the encrypted contact records stored on the device of the sender, wherein the PSS determines whether the recipient identifier corresponds to a contact record associated with the encrypted contact records.

6. The method of claim 1, further comprising:
   based at least in part on a determination that the similarity score does not satisfy the threshold, transmitting a request to the device of the sender to confirm an identity of the recipient, wherein the approval from the device of the sender is received in response to the request.

7. The method of claim 1, wherein each of the encrypted contact records on the device of the sender comprises a corresponding hash value generated by the device of the sender according to a hash function.

8. The method of claim 1, further comprising:
   storing one or more hash values representing encrypted contact records of the sender;
   storing one or more hash values representing encrypted contact records of the recipient; and
   responsive to receiving the notification from the device of the sender, retrieving the one or more hash values representing the encrypted contact records of the recipient based at least in part on the recipient identifier.

9. The method of claim 8, wherein determining the similarity score comprises:
   comparing the one or more hash values representing the encrypted contact records of the sender and the one or more hash values representing the encrypted contact records of the recipient.

10. The method of claim 1, wherein the encrypted contact records on the device of the sender comprise one or more identifiers for a contact associated with a previous payment request associated with the recipient.

11. The method of claim 1, wherein authorizing the payment transaction associated with the payment request comprises:
    transmitting a message indicating approval of the payment transaction to a system of record server.

12. One or more non-transitory computer-readable media comprising computer-readable instructions, which when executed by one or more processors of a payment service system, cause the one or more processors to:
    receive, at a payment processing server, a payment request from a payment application executing on a device of a sender, the payment request including a recipient identifier corresponding to a recipient, wherein the sender and recipient have respective financial accounts associated with the payment service system, the device of the sender having encrypted contact records of the sender stored thereon and shared with the payment service system;
    perform, at the device of the sender, a first authentication process to determine that there is no match for the recipient identifier in the encrypted contact records stored locally on the device of the sender;

receive, at the payment processing server and from the device of the sender, a notification of the first authentication process performed on the device of the sender;

upon receiving the notification, performing, by the payment service server, a second authentication process, wherein the second authentication process is different than the first authentication process performed on the device of the sender and the second authentication process compares encrypted contact records of the sender and encrypted contact records of the recipient to determine a similarity score between the sender and the recipient identified in the payment request, wherein the encrypted contact records of the sender and the encrypted contact records of the recipient are stored in a database communicatively coupled to the payment service system; and authorize a payment transaction associated with the payment request based at least in part on (i) a determination that the similarity score satisfies a threshold or (ii) upon receiving an approval of the recipient from the device.

13. The one or more non-transitory computer-readable media of claim 12, wherein the similarity score is determined based on at least one of the encrypted contact records of the sender or encrypted contact records of the recipient.

14. A system comprising:
a device associated with a sender, wherein the device associated with the sender is configured to perform a first authentication process to determine that there is no match for a recipient identifier in encrypted contact records stored locally on the device associated with the sender; and a payment processing server, wherein the payment processing server is configured to:
receive a payment request from a payment application executing on the device associated with the sender, the payment request including the recipient identifier corresponding to a recipient, wherein the sender and recipient have respective financial accounts associated with a payment service system, the device associated with the sender having encrypted contact records of the sender stored thereon and shared with the system;

receive, from the device of the sender, a notification of the first authentication process performed on the device of the sender;

upon receiving the notification, performing, a second authentication process, wherein the second authentication process is different than the first authentication process performed on the device of the sender and the second authentication process compares encrypted contact records of the sender and encrypted contact records of the recipient to determine a similarity score between the sender and the recipient identified in the payment request, wherein the encrypted contact records of the sender and the encrypted contact records of the recipient are stored in a database communicatively coupled to the system; and authorize a payment transaction associated with the payment request based at least in part on (i) a determination that the similarity score satisfies a threshold or (ii) upon receiving an approval of the recipient from the device associated with the sender if the similarity score does not satisfy the threshold.

15. The method of claim 1, further comprising:
authenticating the device of the sender based at least in part on the encrypted contact records associated with the device of the sender, upon receiving the payment request and prior to determining the similarity score.

16. The one or more non-transitory computer-readable media of claim 12, wherein the execution of the computer-readable instructions by the one or more processors, cause the one or more processors to:
authenticate the device of the sender based at least in part on the encrypted contact records associated with the device of the sender, upon receiving the payment request and prior to determining the similarity score.

17. The system of claim 14, wherein the payment processing server is configured to determine the similarity score based on at least one of the encrypted contact records of the sender and encrypted contact records of the recipient.

18. The method of claim 1, wherein the first authentication process determines that there is no match for the recipient identifier in the encrypted contact records stored locally on the device of the sender by one of:
determining that the recipient identifier does not match any contacts stored on the device of the sender; or
determining that the recipient identifier is not on a list of recipients associated with a prior payment history on the device of the sender.

19. The one or more non-transitory computer-readable media of claim 12, wherein the execution of the computer-readable instructions by the one or more processors, cause the one or more processors to determine that there is no match for the recipient identifier in the encrypted contact records stored locally on the device of the sender by one of:
determining that the recipient identifier does not match any contacts stored on the device of the sender; or
determining that the recipient identifier is not on a list of recipients associated with a prior payment history on the device of the sender.

20. The system of claim 14, wherein the device associated with the sender is configured to determine that there is no match for the recipient identifier in the encrypted contact records stored locally on the device of the sender by one of:
determining that the recipient identifier does not match any contacts stored on the device of the sender; or
determining that the recipient identifier is not on a list of recipients associated with a prior payment history on the device associated with the sender.

* * * * *